(12) United States Patent
Gleichauf et al.

(10) Patent No.: US 9,436,820 B1
(45) Date of Patent: Sep. 6, 2016

(54) CONTROLLING ACCESS TO RESOURCES IN A NETWORK

(75) Inventors: Robert E. Gleichauf, San Antonio, TX (US); Susan E. Thomson, Summit, NJ (US); Dany J. Rochefort, Norfolk, MA (US); Joseph A. Salowey, Seattle, WA (US); Hao Zhou, Solon, OH (US); Fan Wu, Superior, CO (US); Venkateswara Rao Yarlagadda, Bangalore (IN); Russell E. Rice, San Carlos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1354 days.

(21) Appl. No.: 10/909,755

(22) Filed: Aug. 2, 2004

(51) Int. Cl.
  *G06F 15/16* (2006.01)
  *G06F 21/50* (2013.01)
  *H04L 29/06* (2006.01)

(52) U.S. Cl.
  CPC .............. *G06F 21/50* (2013.01); *H04L 63/08* (2013.01)

(58) Field of Classification Search
  CPC ............... G06F 17/30067; G06F 11/0709; G06F 11/0769; G06F 21/31; G06F 21/50; H04L 63/083; H04L 63/08; H04L 63/20; H04L 29/12132
  USPC ........................................................ 709/229
  See application file for complete search history.

(56) References Cited

U.S. PATENT DOCUMENTS

| | | | |
|---|---|---|---|
| 5,983,270 A * | 11/1999 | Abraham et al. | 709/224 |
| 6,301,668 B1 | 10/2001 | Gleichauf et al. | 713/201 |
| 6,499,107 B1 | 12/2002 | Gleichauf et al. | 713/201 |
| 6,530,024 B1 | 3/2003 | Proctor | 713/201 |
| 6,535,227 B1 | 3/2003 | Fox et al. | 345/736 |
| 7,162,649 B1 * | 1/2007 | Ide et al. | 713/165 |
| 7,178,166 B1 * | 2/2007 | Taylor et al. | 726/25 |
| 7,313,618 B2 * | 12/2007 | Braemer et al. | 709/225 |
| 7,353,428 B2 * | 4/2008 | Cheston et al. | 714/38.13 |
| 7,752,317 B1 * | 7/2010 | Cox et al. | 709/229 |
| 2003/0055994 A1 * | 3/2003 | Herrmann et al. | 709/229 |
| 2003/0140128 A1 * | 7/2003 | Cox et al. | 709/221 |
| 2003/0236994 A1 * | 12/2003 | Cedar et al. | 713/200 |
| 2004/0103310 A1 * | 5/2004 | Sobel et al. | 713/201 |
| 2004/0107360 A1 * | 6/2004 | Herrmann et al. | 713/201 |
| 2004/0167984 A1 * | 8/2004 | Herrmann | 709/229 |
| 2005/0149757 A1 * | 7/2005 | Corbett et al. | 713/201 |

* cited by examiner

*Primary Examiner* — Tu Nguyen
(74) *Attorney, Agent, or Firm* — Patterson + Sheridan, LLP

(57) ABSTRACT

A computerized device transmits an access request to a data communications device of a network in an attempt to access network resources within the network. The data communications device, in response and in real-time, transmits a challenge request to the computerized device that directs the computerized device to retrieve configuration, or posture, credentials associated with the computerized device. A policy server receives the challenge response and, based upon a real-time analysis of the posture credentials of the computerized device, determines a security state of the computerized device and either provides some level or denies the computerized device access to the network resources based upon the analysis of posture. The data communications device detects the real-time security state of the computerized device prior to providing the computerized device with controlled access to the network resources, thereby limiting vulnerable computerized devices from accessing the network resources and minimizing the risk that the network resources receive or transmit malware.

53 Claims, 7 Drawing Sheets

CONTROLLING ACCESS TO RESOURCES IN A NETWORK

BACKGROUND

Conventional computerized devices, such as personal computers or laptop computers, connect to computer networks such as the Internet to transmit and receive content or data with other computerized devices in communication with the network. While connected to the network, the conventional computerized devices can be subject to receive malware, such as computer viruses, worms, spy-ware, spam, or other types of unauthorized applications or content (hereafter referred to as "malware"). unauthorized connections. For example, computerized devices typically include anti-virus applications that prevent execution of malicious programs that can harm the computer system. During operation, an anti-virus application associated with the computerized device can detect, note the presence, and/or remove viruses, thereby helping minimize the effect or proliferation of the virus. In another example, computerized devices such as routers or switches typically include firewall applications that limit certain data communications traffic from entry into a portion of a network. During operation, the firewall applications detect and prevent attempted connections to the associated computerized devices for which the traffic is destined.

A computer resource can become infected via any number of different interface "vectors." One of the most common is infection from a public network connection. For example, laptop computers are often configured to move between locations and connect to different networks. In addition to connecting their laptop computer to the corporate Local Area Network (LAN), users frequently, connect that same laptop computer to other networks that provide a direct connection to the Internet. It is while connected to these other networks that the laptop computer may become infected with malware (e.g., such as viruses or worms). When the laptop reattaches to the corporate LAN, the malware can then infiltrate the corporate network and impair the operation of that network and its associated resources.

To minimize the risk of a network and its resources becoming infected by malware, network-based vulnerability scanners can be used to assess the security "posture" of devices connected to that network. These scans are typically performed on the basis of a predefined scanning schedule. For example, in the case where the operator disconnects the laptop from the second network and reconnects the laptop to the conventional LAN, a vulnerability scanner application scans the reconnected computer (e.g., the applications on the laptop) based upon a predefined scanning schedule to assess the vulnerability "posture" of that laptop. If it is determined that the computer is vulnerable to one or more virus or worm exploits, other applications such as Antivirus Signature or Patch Management update programs may be invoked to mitigate those vulnerabilities and/or remove exploits that have managed to gain a foothold.

For example, assume a user connects a laptop computer to a Local Area Network (LAN) operated by a business and, at a later time, disconnects the laptop computer from the LAN and connects the laptop to a second network, such as the Internet. Further assume that while connected to the second network, prior to reconnecting with the corporate LAN, the laptop becomes infected with an unauthorized application, such as a virus or worm. Also assume that a scanning application periodically scans computerized devices connected to LAN (e.g., once a day) for the presence of known vulnerabilities in the device operating system, resident applications, associated security programs, and their respective configurations. In the case where a computer connects to the LAN between scheduled scans, that computer can transmit malware onto the network, its resources, and any other device connected to that network. In addition to infecting and impairing the operation of these other devices this malware could impair the operation of the network itself Another problem with conventional network-based security scanning systems is that the systems cannot always reliably collect the necessary information or detect that there is a problem, either because the systems are unable to access the appropriate information, did not have proper administrative authority, or the time required exceeds predefined resource schedules. These systems also are typically signature-based and only scan for vulnerabilities and exploits that are known a priori. This is why most vulnerability scanners and antivirus applications require periodic signature updates, which creates its own form of race condition relative to the latest class of exploits. This race condition is frequently referred to as a "Day Zero" problem; in that signature based systems frequently are unable to detect the latest exploits on "day zero." It is only after they are updated with the latest signatures that this new class of exploit or vulnerability can be detected.

For example, conventional remote antivirus and vulnerability scanning systems are limited to determining if a computer system operating on a network is configured with up to date virus definitions. Such systems do not provide a mechanism to inquire as to other configuration settings of the computer system operating on the network. By way of a specific example, it may be determined that a certain type and/or version of certain software application contains a known security threat to a network. Virus scanning software may be unable to deal with determining if the application is installed on the computer system. To generalize, conventional security mechanisms do not provide the ability to query the computer system for specific configuration information related to applications, the operating system, virus software, or other security information that may be used to determine the overall "safeness" or security threat that a particular computer poses when operating on a network.

SUMMARY

Conventional techniques for admitting computerized devices onto a network suffer from a variety of deficiencies that involve network security issues. For example, while conventional networks (e.g. wired and wireless LANs, remote VPN access, dial-up access) may authenticate a user or machine prior to admitting a device to the network, these same networks may admit devices without checking whether those devices are capable of introducing malware onto the network. As indicated above, conventional networks may be configured to scan for the presence of vulnerabilities or exploits on devices connected to the network according to a scanning schedule. The drawback with this approach is that many devices may be connected to the network for a significant period of time before they are scanned. It is during periods between these scans that a virus or worm may gain a foothold on these devices. This race condition is compounded by the fact that: a) the latest generation of viruses and worms can propagate across a network much more quickly then their predecessors, and b) more and more devices can roam across networks via technologies such as 802.11-based wireless networking. Accordingly, packet based networks are much more vulnerable to the spread of malware and conventional network admission and scanning techniques do not provide sufficient security to satisfy minimal security, reliability, or availability requirements.

By contrast, embodiments of the present invention significantly overcome such deficiencies and provide mechanisms that include a robust network security architecture and system for controlling access to a network depending on the configuration state or "security posture" of a device when it attempts to connect to that network. According to some embodiments of the invention, computer systems such as personal computers can be configured with security agent software referred to herein as a security, or "posture" agent that can be remotely activated, and one or more software plug-ins, hereafter referred to "posture plug-ins", that the posture agent uses to collect information associated with the security posture of the computer device. The posture agent may be remotely activated in the form of a sequence of challenge requests transmitted by a router or other data communications device in response to a connection request from the computer device to access restricted resources in the network. A computer device, in one arrangement, is a device with a single network interface ("single-homed") that terminates a network connection, such as a laptop computer or a network enabled Personal Data Assistant (PDA), or a device with multiple network interfaces ("multi-homed") such as another router, switch, bridge, or a laptop or data server computer configured to allow the forwarding, routing, and/or bridging of packets. The challenge request sequence happens in real time and causes the posture agent within the computerized device to collect information associated with the security posture of the computer device, hereafter referred to as "posture credentials", from one or more posture plug-ins, and to transmit these posture credentials securely to a policy server operating within the network to determine what type of admission policy and level of network access should be assigned to that device. Posture credentials collected in real time from the posture plug-ins by the posture agent can identify critical security information such as what particular virus software and virus definition versions are installed within the computer system, when was the last time a local antivirus scan was executed, what operating system patches are installed within the computer system, what particular types and versions of software applications are configured and active within the computer system, and so forth. By providing a security posture based challenge-response mechanism for network admission control, embodiments of this invention are able to dramatically reduce the opportunities for injection of malware into a network.

During an example operation of one embodiment, the computerized device, such as a personal computer attempting to communicate with restricted resources in the network, transmits an access request to the data communications device (e.g., a router configured with embodiments of the invention) in an attempt to access the network resources within the network. The access request may be as simple as transmitting network packets (data, voice, and/or video) to other devices or resources on the network, or involve an explicit signaling request to cause the network admission control challenge-response sequence to take place. The data communications device that detects the presence of the new device initiates a challenge-response sequence to the device that directs a posture agent running on the computerized device to retrieve posture credentials describing the security posture of the computerized device. On detecting a new device the data communication device sends a challenge request to the computer device. The posture agent running on that computer device then transmits an initial challenge response back to the data communications device which forwards the challenge response onto the policy server. The policy server in the network continues the challenge-request sequence, which includes setting up a secure channel to the posture agent via the data communications device so that the posture credentials can be communicated securely. Once the secure channel has been established, the policy server submits a request to the posture agent via the data communications device for all or a selected set of posture credentials. The posture agent requests the specified posture credentials from the associated posture plug-ins installed on the device and transmits the requested posture credentials back to the policy server via the data communications device. Based upon an analysis of the posture credentials returned by the computerized device, the policy server determines what type of admission policy and level of network access and privileges should be extended to the computer device. Devices that are compliant with network admission policy would typically be given full network access. Devices that are only mildly out of compliance may be simply issued a warning that they are in danger of falling out of compliance with corporate policy. Devices that are more significantly out of compliance may be placed on an isolated, or "quarantine" network segment where they can be brought into compliance. Devices that violate core admission requirement may be denied network access entirely. In all cases, the response to device posture is a policy decision deduced by the policy server in response to posture credentials retrieved from a device when it attempts to enter a network.

The data communications system, therefore, detects the presence of a new host attempting to access restricted resources in the network, and initiates an exchange that allows a policy server to gather real-time security state, or "posture", of the computerized device prior to providing the computerized device with access to the network resources, thereby limiting at-risk or vulnerable computerized devices from accessing the network resources and minimizing the risk that the network resources receive malware. It is also possible that this invention is used only for monitoring and auditing compliance of computer devices to a security policy, rather than enforcing compliance to security policy as the above-mentioned examples suggest. In other words, it is possible to allow computer devices to access resources in the network regardless of the posture of the device, while still performing the challenge-response sequence for the purpose only of monitoring and auditing compliance to a security policy.

In one arrangement, the data communications device assigns devices that are out of compliance with admission requirements to a quarantine, or remediation network. This remediation admission policy is issued by the policy server based on comparison of the posture credentials of the device relative to predefined network admission requirements, or security policy. At the same time the policy server determines access, the policy server can transmit one or more notification messages to the posture agent and/or posture plug-ins running on the computer device attempting the gain access to the network. The notifications may include the results of the posture check, remediation actions (if any) and an informational message to be displayed to the user, or written to a local log file. Displaying an informational message would be appropriate on a computer that includes a user console, whereas simply logging the message would be more appropriate for a device such as a printer that may not possess a human readable display. In addition, when directed by the policy server, the posture agent may forward the notification to one or more posture plug-ins for processing.

In response to a notification, an additional posture agent or posture plug-in response might be to automatically connect the computer device, or prompt a user to manually connect the computer device, to a remediation server that resides on the quarantine network, where the remediation server is configured to upgrade or provide up-to-date patches to the operating system or applications, such as anti-virus applications, associated with the computerized device. The device should be admitted into the original network if the remediation process was successful. Otherwise the device will be again identified as being at some level of non-compliance and the appropriate response will be invoked by the policy server.

The remediation server acts to minimize the susceptibility of the computerized device to an unauthorized application, such as a virus, thereby minimizing the potential for the computerized device to carry an unauthorized application onto the network at a later time. In this manner, embodiments of the invention can perform the real-time analysis of posture credentials that describe the configuration of the computer system attempting to gain access a network. This analysis can result in a posture agent and/or posture plug-ins receiving a quarantine message causing the computer system to be reconfigured to more fully comply with required security policy prior to being able to communicate within the network.

Once the computer device has completed the remediation process, the computer device, can attempt to re-enter the original network. This may be achieved by the computer device transmitting a message to the data communications device to request that the posture of the device be re-validated, and/or the data communications device may periodically query the computer device for a posture update, hereinafter called "posture update query". When the posture agent responds to a posture update query in a way that indicates that the posture has been updated, the data communications initiates a fresh challenge-response sequence to enable the policy server to re-assess the posture credentials and apply new admission to the data communications device. The posture update query mechanism is used to detect any change in posture of the computer device. Changes may be due to the remediation process, other software update processes, user action, or infection by some type of malware. In particular, in one embodiment, between each periodic full challenge-response sequence to check posture credential as described above, the data communications device may periodically transmit the posture update query message to the posture agent.

The status query mechanism is an optimized, secure version of the full challenge-response mechanism that operates only between the posture agent and the data communications device and does not involve the policy server. The status query mechanism is a simple authenticated challenge-response mechanism used to determine whether the posture on the computer device has changed, and also to make sure that the computer device that responds to the request is the same one that was previously authorized to access the network. If the status query fails, e.g. because the posture agent responds with an error, the posture agent does not respond at all or the posture agent indicates that the posture agent has changed, the data communications device attempts the full challenge-response sequence to enable the policy server to re-assess the posture credentials and apply a new access policy on the data communications device.

In another arrangement, even after a computer system has been authorized to communicate in the network using the aforementioned examples and even if the computerized device does not indicate that the posture has changed, the network can nevertheless periodically re-run the full posture check of authorized computer systems to ensure that their posture is still compliant with the network admission policy. This is useful in addition to the posture update query mechanism above because the rules in the policy server may change. In particular, in one embodiment, the data communications device periodically re-initiates the full challenge-response sequence after expiration of a time period to enable the policy server to request the posture agent to re-transmit the posture credentials for evaluation against the latest admission policy rules configured in the policy server.

In another arrangement, the invention also allows posture credentials to be checked at the same time as a user of a computerized device or the computerized device itself is authenticated. The invention allows the policy server to request user identity information, machine identity information as well as posture credentials in the same secure tunnel, and apply network access policies based on some combination of who the user is (e.g. joe smith.companyX.com) whether the computerized device is a corporate asset (e.g. machine1.engineering.companyX.com) as well as the value of posture credentials as described above. By allowing user identity, machine identity and posture credentials to be checked together at one time, more powerful admission policies can be enforced on the policy server. For example, different types of posture information may be checked for different users, e.g. computer systems belonging to employees of an organization may be expected to have the posture agent with specific posture plug-ins installed on the computer devices, whereas consultants or business partners of an organization may not. Different categories of user may be provided different types of access based on who they are and the type of posture information that can be gleaned from the device being used to access the network. The invention thus allows the network to be protected not only from computer devices that may be vulnerable to infection based on their security posture, but also makes sure that networks are used only by legitimate, known users and known machines.

According to other embodiments of the invention, computer systems such as personal computers may not be configured with a posture agent that can be remotely activated. This may be because the posture agent software is not yet available or may never be implemented devices with less common operating systems (e.g. printers) or it is not feasible to deploy in certain customer environments where the computerized devices used are not owned or managed by a single organization, (e.g. universities). In this case, embodiments of the invention allow for exception lists to be created in the data communications device to exempt specified computerized devices from the posture admission control check and to have pre-configured access policies applied.

In another arrangement, the data communications device, on detecting a new computer device attempting to access restricted resources in the network, and on detecting that it does not have a posture agent installed, may nevertheless ask a policy server for a network admission policy for the computer device. The policy server may consult a local exception list based on the identity of the computer device, or it may trigger real-time network-based vulnerability scanning of the computer device, fingerprinting of the computer device, Web page script download to computer device and possibly other mechanisms to determine as much information about the computer device in the absence of a posture agent being installed on the device.

Based on posture information gleaning from these other mechanisms, the policy server may determine the appropriate admission rules to be downloaded to the data communications device including allowing access to restricted resources, quarantining the computer device or denying access completely. In this manner, the invention allows network admission control to be applied even in the absence of a posture agent on all computerized devices attempting to use the network.

It is to be understood that the system of the invention may be embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide a comprehensive network security architecture that includes mechanisms for controlling access to resources in a network based on some combination of the security posture of the computer system as well as the identity of the computer system and the user of the computer system. In one configuration, an operating environment includes a computerized device and a network having network resources, a data communications device, and a policy server. The operating environment may also include audit servers that are able to do on-line scanning or fingerprinting of computerized devices in the absence of a posture agent being installed.

During operation, the computerized device such as a personal computer transmits packets or a signaling request to the data communications device in an attempt to access the network resources within the network. The data communications device, in response, initiates a sequence of challenge requests to the computerized device that ultimately directs the computerized device to retrieve configuration credentials associated with the computerized device in a secure manner. Generally, the configuration credentials indicate a security "posture" of the computerized device. After the data communications has sent the initial challenge request to the posture agent and the posture agent responds, the data communications device forwards the response to the policy server. The policy server continues with the challenge-response sequence to the computer device via the data communications device. The policy server receives the challenge responses and, based upon an analysis of the posture credentials of the computerized device, determines a security state of the computerized device and either provides some level of or denies the computerized device access to the network resources based upon the analysis. The data communications system, therefore, detects the real-time security state of the computerized device prior to providing the computerized device with access to the network resources, thereby limiting at-risk or vulnerable computerized devices from accessing the network resources and minimizing the risk that the network resources receive malware. In effect, this invention helps "dampen" the propagation of worms and viruses, and related side effects, by preventing systems capable of participating in such an outbreak from gaining access to the network.

Figure 1:
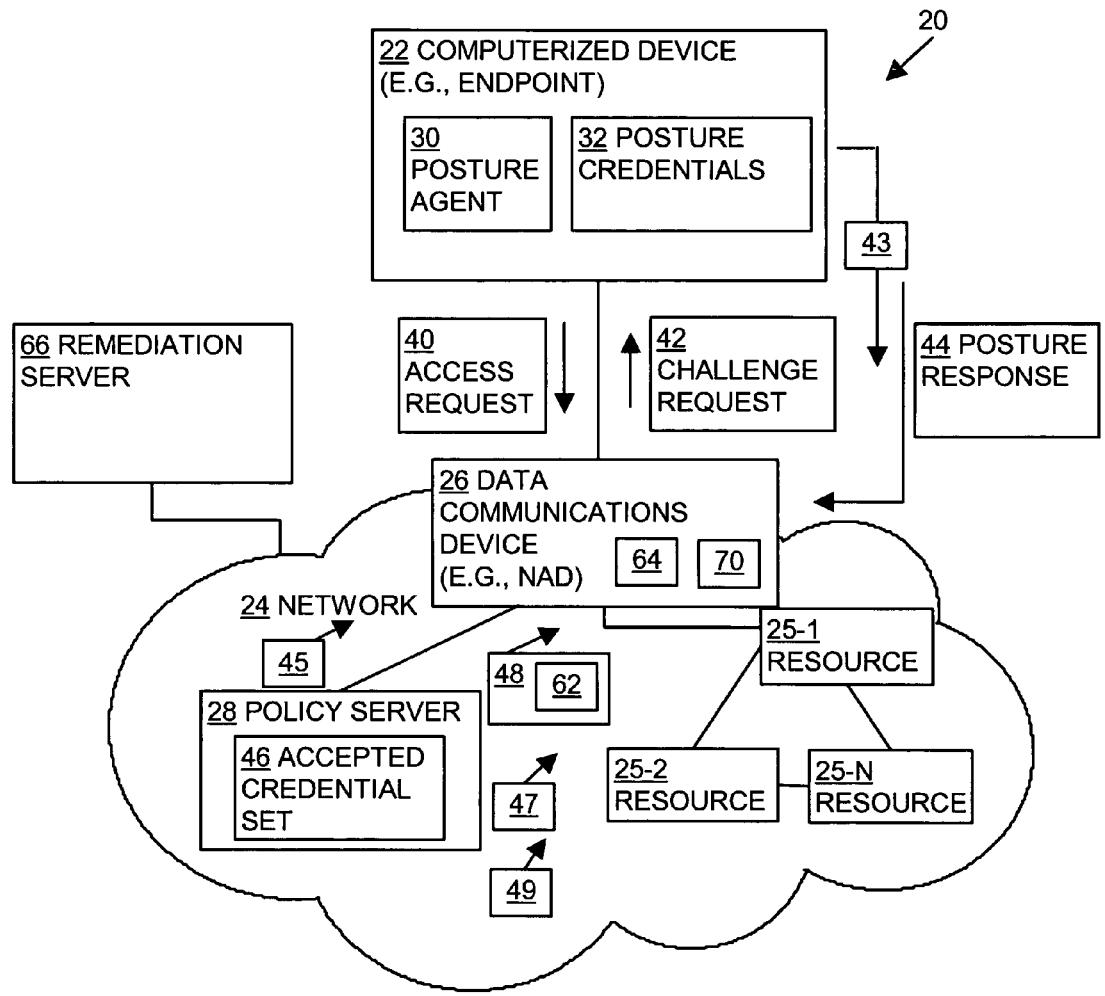
FIG. 1 shows a data distribution system, according to one embodiment of the invention.

FIG. 1 illustrates a data communications system 20, according to one embodiment of the invention. The data communications system 20 includes a user device (e.g., computerized device) 22 and a network 24 having network resources 25, a data communications device 26, and a policy server 28.

The user device or computerized device 22 is configured to attempt to access the network resources 25 within the network 24. Example user devices 22 include, but are not limited to, personal computers (e.g., laptop computers), data servers, IP-enabled and cellular telephones, personal digital assistants (PDA's), etc. Other user devices include multi-homed network devices such as routers, switches, and wireless access points, for example. The user device 22 includes sets of configuration credentials 32, also referred to hereinafter as "posture plug-ins". Each posture plug-in 32 indicates a security posture with respect to a particular manufacturer's application (e.g., security status, setting, value, active applications, or other configuration data) of the user device 22 with respect to one or more security vulnerabilities of the device. The security posture of the user device 22 relates, for example, to the user device's 22 ability to resist reception or transmission of malware (e.g., viruses), content (spam and/or data theft), or access by unauthorized users. For example, in one arrangement, the user device 22 includes a posture plug-in 32 that indicates the status of an anti-virus applications installed on the user device 22 (e.g., the association of an anti-virus application with the user device 22 or a version of the anti-virus application or its virus definition files associated with the user device 22). In another arrangement, the user device 22 includes a posture plug-in 32 that indicates the status of intrusion prevention (e.g., firewall) applications associated with the user device 22. In another arrangement, the user device 22 includes a posture plug-in 32 that indicates the version of operating systems used by the user device 22 or the presence of updated "patches" associated with the operating systems. It is to be understood that the posture plug-in 32 represents any type of configuration information that a computerized device 22 can maintain and that the posture agent 30 is able to access, as will be explained herein.

The posture plug-ins 32, in one arrangement, is configured in an extensible messaging format, such as Type-Length-Value (TLV) format or an extensible markup language (XML) format. The TLV or XML format is a well-defined, application-independent form for representing information or data. As indicated above, the user device 22 may have one or more posture plug-ins 32 as provided by the manufacturer of an application, or third parties. With the posture plug-ins 32 provided in the extensible messaging format, as devices external to the user device 22 (e.g., the policy server) access the posture credentials, such devices can, in turn, recognize the information contained within the configuration regardless of the source (e.g., manufacturer) of the posture credentials 30. Separate independent applications may operate within the computerized device 22 to maintain the different posture plug-ins 32. As an example, some posture plug-ins 32 can be maintained by virus software while other posture plug-ins 32 are maintained by the operating system of the computerized device 22. There is a well-defined application-programming interface (API) hereinafter named "posture plug-in API" that each posture plug-in manufacturer must implement to allow the posture agent to access posture information.

The user device 22 also includes a posture agent 30 configured to receive a sequence of challenge requests 42, and in response, collects posture credentials from the installed posture plug-ins 32 and transmits posture credentials 32, associated with the user device 22, to the policy server 28. The posture agent 30, embodied as a software or hardware application, works in conjunction with the data communications device and policy server 28 to verify a security status of the user device 22 prior to the user device 22 accessing the network 24 (e.g., the network resources 25 within the network 24). Such verification minimizes the ability for the user device 22 to transmit an unauthorized application or content (e.g., such as a virus or a worm) into the network 24, thereby potentially "infecting" the network resources 25 within the network 24. The posture agent 30 may also receive notifications from the policy server 30 based on the results of the posture check that may include informational messages or remediation actions to be performed. These notifications may be processed by the posture agent 30 itself or these notifications may be passed to the responsible posture plug-in 32 for processing using the posture plug-in API. The posture agent 30 is also responsible for determining whether the posture of the computer device 22 has changed by learning of any changes from the posture plug-ins 32 through the posture plug-in API. The posture agent 30 is responsible for answering the periodic posture update query from the data communications device between the full posture challenge-response sequences.

The network 28 is a computer network, such as an enterprise network or the Internet, which includes the network resources 25, the data communications device 26, and the policy server 28. The network 28 may include network access from user devices 22 through different types of network transport including a wired local area network (LAN), a wireless LAN, a VPN connection, or a dial-up connection, for example.

The network resources 25-1, 25-2, 25-N, in one arrangement, are configured as servers that contain content accessible by the user device 22 via the network 24. In another arrangement, the network resources 25-1, 25-2, 25-N are configured as peripheral devices, such as printers, or network attached storage, for example, that may be accessible (i.e., if allowed according to the system of the invention) by the user device 22 via the network 24.

The data communications device or network access device 26, which may be a router, switch, gateway or other such device deployed one or more Layer 2 or Layer 3 network hops from the user device 22 is configured to detect attempted connections to the network 24 by the user device 22. As an example, the data communications device 26 can maintain a table of those computerized devices 22 that have already been authorized for access to various resources within the network 24. When an access attempt (e.g., a new TCP SYN connection from a new source IP address or a special access request e.g. 802.1x EAP Start message) is made from a new computerized device 22 into the network 24, the data communications device 26 can detect such access and trigger operation of the system of the invention. The data communications device 26 generally works in conjunction with the policy sever 28 to limit the ability for the user device 22 to transmit an unauthorized application into the network 24. The data communications device 26 is also responsible for helping detect when the posture of authorized computer devices 22 has changed so that the full challenge-response posture sequence can be triggered again. The data communications 26 is also further responsible for periodically triggering the full posture challenge-response sequence even if a posture change has not been detected.

The policy server 28 is a computerized device configured to determine the particular posture credentials to request from the posture agent, and validate the posture credentials 32 associated with the user device 22. Based upon the review of the posture credentials 32, the policy server 28 either allows some level of network access or denies the user device 22 access to the resources (e.g., the network resources 25) within the network 24. The policy server 28 is responsible for downloading the appropriate access instructions to the data communications device 26. The policy server 28 also determines what notifications e.g. remediation actions, informational messages to be displayed to user, to send back to the computerized device once the posture has been reviewed and the level of access determined. In addition to checking posture credentials, the policy server 28 may also be responsible for authenticating the computerized device 22 and/or authenticating the user of the computerized device 22, and determining an access policy based on both posture information and identity information.

During operation of the system 20, the user device 22 transmits packets or a signaling request 40 to the network 24 in an attempt to access the network resources 25 within the network 24. The data communications device 26 intercepts the packets or access request 40 and, in response, transmits an initial challenge request 42 to the computerized device 22. The posture agent 30 of the computerized device 22 transmits, to the data communications device 26, a response 43 to the challenge 42. The data communications device 26 forwards the response 43 to the policy server 28. The policy server 28 then transmits one or more challenge requests 45 to the posture agent 30 on computerized device 22 via the data communications device 26 to set up secure communications between the posture agent 30 and the policy server 28. Once secure communications have been established, the policy server 28 makes one or more further challenge requests (e.g., posture requests) 47 for posture credentials from specified posture plug-ins 32 on the user device 22 via the data communications device 26. The policy server 28 may also make one or more requests 49 to authenticate the computerized device 22 or the user of the computerized device 22 via the data communications device. The data communications device 26, policy server 28, and posture agent 30 may securely transmit posture and/or identity using protocols such as the Extensible Authentication Protocol (EAP), Protected Extensible Authentication Protocol (PEAP) and Flexible EAP Authentication using Secure Tunnel Protocol (EAP-FAST) over various network transports, including a Layer 2 transport such as wired LAN (Ethernet) and wireless LANs, and a Layer 3-based transport such as User Datagram Protocol (UDP).

When a policy server 28 makes the posture request 47 to the computerized device 22, the policy server 28 directs the posture agent 30 (i.e., operating as a daemon) of the user device 22 to retrieve the specified posture credentials from associated posture plug-ins 32 installed on the user device 22. The posture credentials 32 indicate a security posture of the resident operating system and associated applications of the user device 22 (e.g., the presence of anti-virus or firewall software associated with the user device 22 or an indication of the versions or patch updates of these applications of the user device 22). The posture agent 30, for example, can utilize the posture plug-in API described above to request the specified posture credentials from the associated posture plug-ins 32 installed on the computerized device 22. The posture agent 30 packages the posture credentials 32 from the requested posture plug-ins within a posture response message 44, for example. The user device 22 transmits the posture response 44 to the network 24 where the posture response 44 includes the posture credentials 32 of the user device 22. The data communications device 26 receives the posture response 44 and transmits or forwards the challenge response containing the posture credentials 32 to the policy server 28 for processing.

After receiving the posture credentials using the above message flow (e.g., initial challenge request 42, challenge response 43, challenge request 45, posture request 47, and posture response 44), the policy server 28 compares the posture credential information from posture plug-ins 32, with an accepted credential set 46. For example, assume the posture credential information 32 indicates that the user device 22 is configured with an anti-virus application from a particular manufacturer and has a particular virus definitions update. The policy server 28 reviews the accepted credential set 46 to detect the presence (e.g., a listing) of the identity of the anti-virus application and definition version from the particular manufacturer within the accepted credential set 46. Assume, for example, that based upon the comparison the policy server 28 detects the presence of, or a listing of, the same anti-virus application and definition version from the particular manufacturer within the accepted credential set 46. In such an example, in one arrangement, the policy server 28 transmits an access instruction 48 to the data communications device 26 that directs the data communications device 26 to allow communications between the user device 22 and the resources 25 within the network 24. Assume in another example, however, that based upon the comparison the policy server 28 fails to detect the presence of, or a listing of, the anti-virus definition version from the particular manufacturer within the accepted credential set 46. In such an example, in one arrangement, the policy server 28 transmits an access instruction 48 to the data communications device 26 that directs the data communications device 26 to restrict or completely reject communications from the user device 22 to the resources 25 within the network 24. This may include providing limited network access, such as only providing a path out of a corporate network to the Internet, but fully restricting access to any internal sub-networks.

In the above-described arrangement, the system 20 detects the real-time security posture of a user device 22 prior to providing the user device 22 with access to the network resources 25. By detecting the real-time security state of the user device 22, the system 20 limits "vulnerable" user devices 22 (e.g., user devices 22 that are not configured with anti-virus or up-to-date anti-virus applications) from accessing the network 24. As such, the system minimizes the risk that the network 24 or network resources 25 become "infected" with malware. For example, the policy server 28 detects the presence or absence of particular anti-virus applications associated with the user device 22 and either allows or denies the user device 22 access to the network resources based upon the results of the detection. The policy server 28, therefore, minimizes the potential that the user device 22 carries a virus to infect the network resources 25 of the network 24. In addition, since the posture agent 30 uses a well-defined and extensible posture plug-in API to identify, collect and gather configuration credential information from posture plug-ins 32 developed for various manufacturer-specific applications, as new security features are implemented within computer systems such as personal computers, the policy server 28 can request the posture agent 30 to request additional types of posture credentials from an existing posture plug-in 32 or from an additional posture plug-in produced by a new security application or third-party. This allows the system of the invention to limit the processing burden of the posture agent by using a posture plug-in to query each vendor specific application and ensure that a new version of the posture agent 30 does not need to be installed on a computer device 22 whenever new posture credentials or posture plug-ins 32 are available and need to be checked.

In effect, the posture agent 30 serves as an extensible policy "broker" that fields posture requests from a policy server 28 and returns posture credentials to the policy server 28 based on responses from one or more posture plug-ins 32. The posture agent 30 also acts as a broker for delivering notifications back to the posture plug-ins 32 from the posture server 28 in response to the comparison of the posture credentials to accepted credential set 46.

While FIG. 1 and the above description outlines operation of the system 20 as a whole, the following Figures, and associated descriptions, provide details regarding the operation of each of the computerized device 22, the data communications device 24, and the policy server 28 within the system 20.

Figure 2:
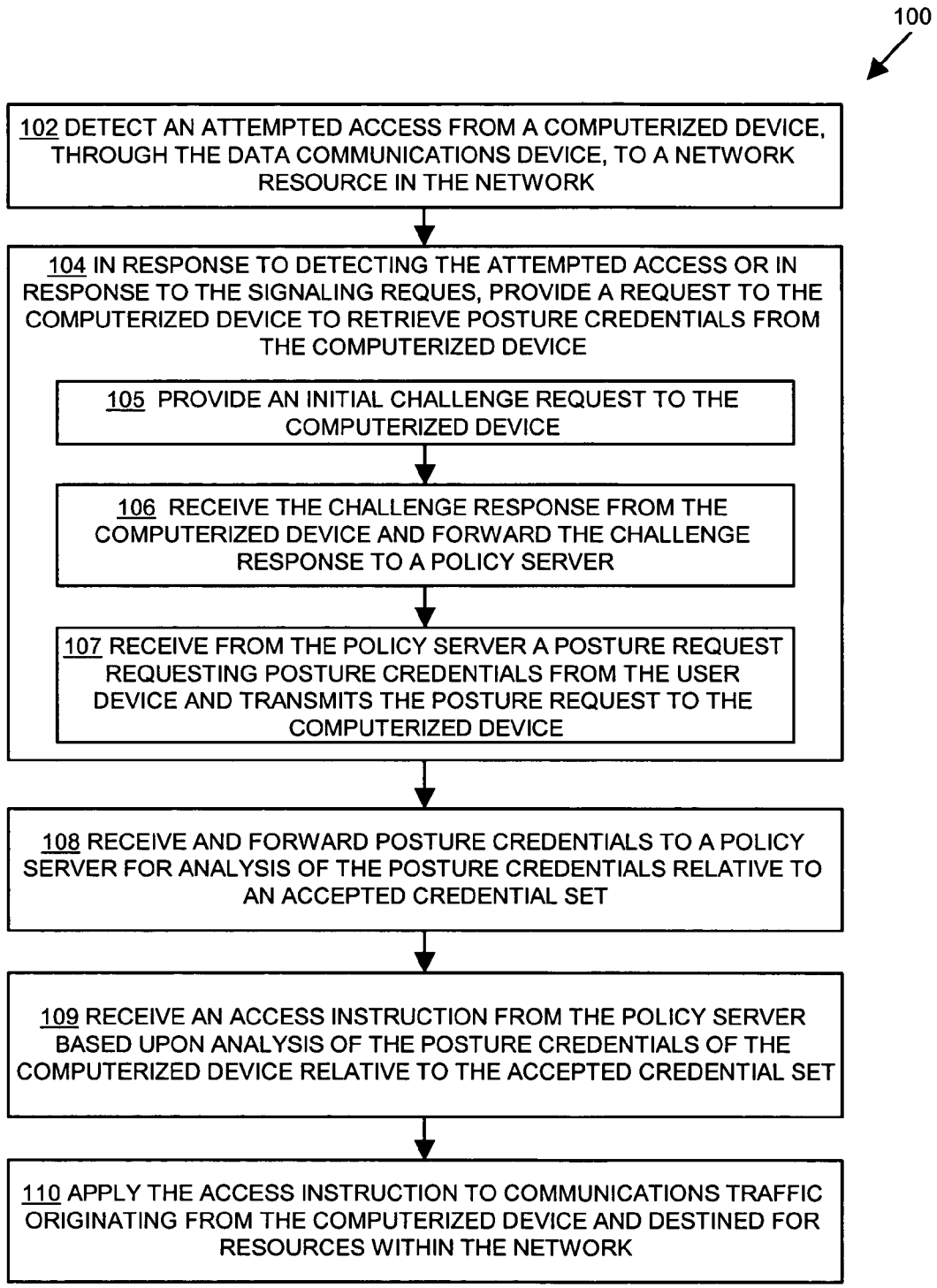
FIG. 2 illustrates a flow chart of a procedure performed by a data communications device of the system of FIG. 1, according to one embodiment of the invention.

FIG. 2: Data Communications Device

FIG. 2 illustrates a flowchart 100 of a procedure performed by the data communications device 26 of data communications system 20 when controlling a user device's 22 access to resources 25 in the network 24.

In step 102, the data communications device 26 detects an attempted access from a computerized device 22, through the data communications device 26, to a network resource 25 in the network 24. For example, the data communications device 26 receives packets or an access request 40 from the user device 22, such as a TCP SYN packet transmitted from the user device 22 during a connection initiation handshaking procedure initiated by the user device 22, or a special signaling request from user device 22 to the data communications device 26 to initiate the authentication and/or posture validation process.

In step 104, in response to detecting the attempted access or in response to the signaling request, the data communications device 26 provides a request to the computerized device 22 to retrieve posture credentials 32 from the computerized device 22. In one arrangement, the data communications device 26 transmits and receives a series of messages to retrieve the posture credentials from the computerized device 22. Steps 105, 106, and 107 outline an arrangement of such a process.

In step 105, the data communications device 26 provides an initial challenge request 42 to the computerized device 22. For example, when the computerized device 22 receives the challenge request 42 from the data communications device 26, the computerized device (e.g., the posture agent 30 of the computerized device 22) transmits a response 43 to the challenge 42 to the data communications device 26.

In step 106, the data communications device receives the challenge response 43 from the computerized device 22 and forwards the challenge response 43 to a policy server 28. The policy server 28, in one arrangement, then transmits a sequence of challenge requests to the posture agent 30 on computerized device 22 via the data communications device 26 to set up a secure communications between the posture agent 30 and the policy server 28.

Once secure communications have been established, in step 107, the data communications device 26 receives from the policy server 28 a posture request 47 requesting posture credentials 32 from the user device 22 and transmits the posture request 47 to the computerized device 22. Such a request 47 allows the policy server 28 to authenticate the device or user of the device 22. When a policy server 28 makes a posture request 47 to the computer device 22, the policy server 28 directs the posture agent 30 of the user device 22 to retrieve the specified posture credentials from associated posture plug-ins 32 installed on the user device 22 and transmit the requested posture credentials back to the data communications device 26.

In step 108, the data communications device 26 receives and forwards posture credentials 32 to a policy server 28 for analysis of the posture credentials 32 relative to an accepted credential set 46. As indicated above, the configuration credentials 32 indicate a security posture or security status of the user device 22.

In step 109, the data communications device 26 receives an access instruction 48 from the policy server 28 based upon analysis of the posture credentials 32 of the computerized device 22 relative to the accepted credential set 46. The access instruction 48 directs the data communications device 26 to either allow some level of network access or deny the computerized device 22 access to the network resources 25 of the network 24.

In step 110, the data communications device 26 applies the access instruction 48 to communications traffic originating from the computerized device 22 and destined for resources 25 within the network 24. By applying the access instructions 48 to communications from the user device 22, the data communications device 26 allows or denies computerized device 22 access to the network 24 based upon the probability or risk of the user device 22 carrying malware, content, or viruses (e.g., the "vulnerability" of the user device 22). Such application of the access instructions 48 minimizes the ability for a computerized device 22 to introduce an unauthorized application or content into the network 24, thereby infecting or causing malfunction of the network resources 25.

For example, assume that during the analysis of the posture credentials 32 of the computerized device 22, the policy server 28 detects the presence of an anti-virus application (e.g., or an up-to-date anti-virus application) associated with the user device 22. The access instructions 48 generated by the policy server 28 and then transmitted to the data communications device 26 direct the data communications device 26, in turn, to allow communications traffic between the user device 22 and the network resources 25. In such an example, because the user device 22 includes an associated anti-virus application, the user device 22 has a relatively low risk for receiving, and therefore transmitting, a virus to the network resources 25 of the network 24. As such, the data communications device 26 allows the user device 22 to access the network resources 25, based upon the access instruction 48 because the user device has a low probability or risk of passing a virus into the network 24.

In another example, assume that during the analysis of the posture credentials 32 of the computerized device 22, the policy server 28 fails to detect the presence of an anti-virus application (e.g., or an up-to-date anti-virus application or virus definition file) associated with the user device 22. The access instructions 48 generated by the policy server 28 and then transmitted to the data communications device 26 directs the data communications device 26, in turn, to restrict (e.g., prevent) communications traffic between the user device 22 and the network resources 25. In such an example, because the user device 22 fails to include an associated anti-virus application, the user device 22 has a relatively high risk for transmitting a virus to the network resources 25 of the network 24. As such, the data communications device 26, in one arrangement, denies the user device 22 access to the network resources 25, based upon the access instruction 48 because the user device has a relatively high probability or risk of passing a virus into the network 24.

For example, assume that the policy server 28 compares the posture credentials 32 of a user device 22 with an accepted credential set 46. Further assume that based upon the comparison, the policy server 28 finds a discrepancy between the posture credentials 32 of the user device 22 and the accepted credential set 46. The policy server 28, as a result, transmits an access instruction 48 to the data communications device 26 that directs the data communications device 26 to prevent the user device 22 from accessing the network resources 25. In this example, when the data communications device 26 applies the access instruction 48 to communications from the user device 22, the data communications device 26 substantially completely restricts (e.g., denies) the user device 22 from communicating with or accessing the network resources 25 at all. Such application of the access instructions 48 minimizes the probability for the user device 22 (e.g., a "vulnerable" device or a device susceptible to a virus) to introduce an unauthorized application or content into the network 24, thereby infecting or causing malfunction of the network resources 25.

In another example, when the data communications device 26 applies the access instruction 48 to restrict a user device's 22 access to the network resources 25, the data communications device 26 limits the user device's 22 access to only a portion of the network resources 25 (i.e., for example, of the network resources 25-1, 25-2, and 25-N, the data communications device 26 allows the user device 22 to communicate only with resources 25-1, and 25-2). The access instruction 48 may permit traffic from user device 22 only to certain destination addresses, e.g. IP address of remediation server, and only to certain protocols or ports, e.g. HTTP traffic. Therefore, as the data communications device 26 applies the access instruction 48 to communications traffic originating from the computerized device 22, the data communications device 26 limits or restricts user device access to a subset of the network resources 25 based upon the results of the examination.

In one arrangement, application of the access instruction is based on both an address associated with the computerized device 22, such as a source address (i.e., the network address of the user device 22), and a destination address (e.g., a network address of a resource 25 in the network 24 such as a remediation server). The data communications device 26 uses the source address and the destination address associated with the data traffic (e.g., access request 40, challenge response 43, and posture response 44) from the user device 22, to restrict user device 22 access to particular resources 25 within the network 24 (e.g., the data communications device 26 provides a layer 3 restriction). This can result, for example, in providing a limited path to certain network resources 25-1, while disallowing access to other resources 25-2 through 25-N.

In another arrangement, the application of the access instruction is a specific protocol associated with the data traffic from the user device 22. Data traffic includes a communications protocol identifier (e.g., HTTP, SMTP) that indicates the communications protocol used by the user device 22 in communicating with the network resources 25. During operation, the data communications device 26 examines the communications protocol identifier to restrict user device 22 access to particular resources 25 within the network 24 by limiting the kinds of applications that can be used (e.g., only Web access). Thus, the data communications device 26 allows the user device 22 to access the network resources 25 that are configured to communicate only according to the communications protocol identified by the user device 22 (e.g., the data communications device 26 provides a layer 2 or layer 3 or application layer restriction).

As described, the data communications device 26 restricts the computerized device's 22 access to resources 25 within the network 24 based upon instructions 48 provided by the policy server 28. The data communications device 26 also works in conjunction with the policy server 28 to upgrade or "fix" applications associated with the user device 22 when the policy server 28 detects that the user device 22 is vulnerable or susceptible to a virus or has other configuration problems.

Figure 3:
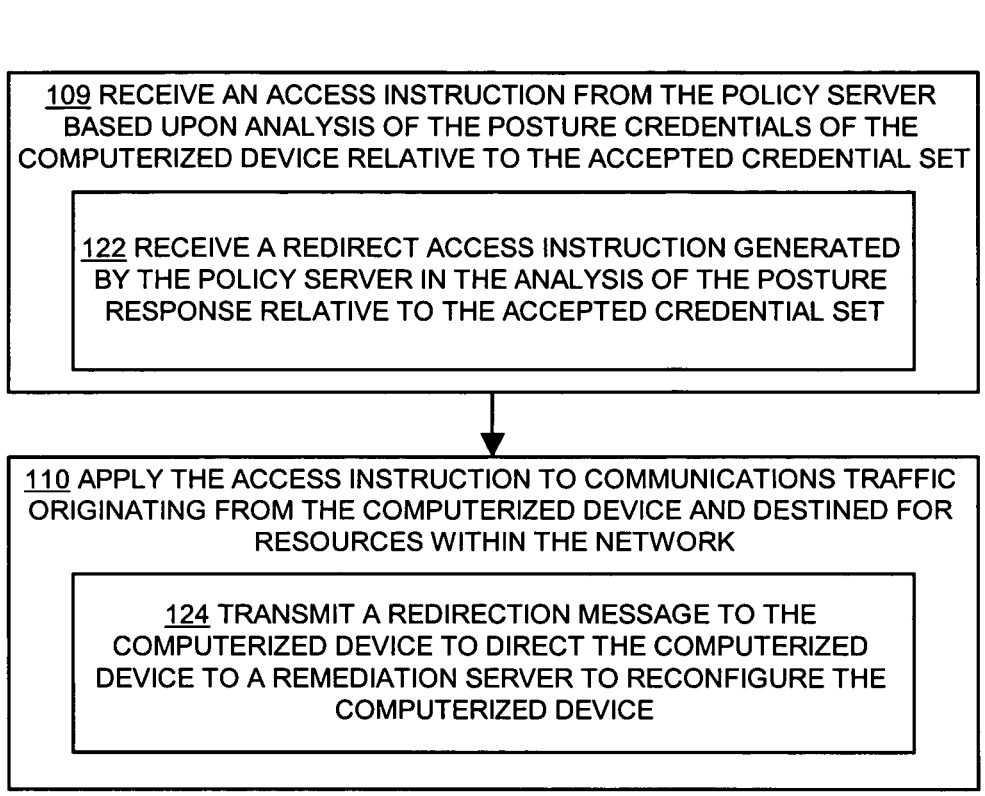
FIG. 3 illustrates a flow chart of a procedure performed by a data communications device of the system of FIG. 1, according to one embodiment of the invention.

FIG. 3: Data Communications Device and URL Redirect:

FIG. 3 illustrates a flowchart 120 that, taken in conjunction with FIG. 1, outlines additional steps performed by the data communications device 26 when performing steps 109 and 110, as shown in FIG. 2.

In step 122, when (e.g., in addition to or instead of) receiving an access instruction 48, the data communications device 26 receives a redirect access instruction 62 generated by the policy server 28 in the analysis of the posture response 44 relative to the accepted credential set 46.

For example, assume that when comparing the posture credentials 32 of the user device 22 with the accepted credential set, the policy server 28 detects the presence of an anti-virus application associated with the user device 22 and further detects that the anti-virus application is out-of date (e.g., the user device does not have the most recent version of the anti-virus application). Based on such detection, the policy server 28 determines that a redirect access instruction 62 should be applied to HTTP traffic from the user device 22. When the data communications device 26 receives communications traffic from the computerized device 22, the data communications device 26 applies the redirect access instruction 62.

In step 124, when applying the redirect access instruction 62, the data communications device 26 transmits a redirection message 64 to the computerized device 22 to direct the computerized device 22 (e.g., HTTP traffic from the computerized device 22) to a remediation server 66 to reconfigure the computerized device 22.

For example, during operation, when the data communications device 26 applies the redirect access instruction 62 the data communications device 26 transmits, to the user device 22, a remediation server address as part of the redirection message 64. Rather than establishing communications with the network resources 25, the user device 22 establishes a connection with the remediation server 66. The remediation server 66, in one arrangement, is configured to upgrade or provide up-to-date patches to applications, such as anti-virus applications, associated with the user device 22. The remediation server 66 acts, for example, to minimize the susceptibility of the user device 22 to an unauthorized application, such as a virus, thereby minimizing the potential for the user device 22 to carry an unauthorized application or content onto the network 24 at a later time.

During operation, after the data communications device 26 validates the posture of the user device 22 and applies the appropriate access instruction 48 and/or redirect access instruction 62, the user device 22 establishes a connection with one or more network resources 25 during a communications session. The duration of such a connection can last for a relatively long period of time. During this time period, an operator or the remediation process can upgrade certain security applications associated with the device so that a non-compliant device now becomes compliant to security policy (e.g. updates the anti-virus signature file to the most current version). In addition, it is also possible that an operator can reconfigure certain applications associated with the user device (e.g., removes an anti-virus application) or replace the user device with a second user device (e.g., where the configuration credentials of second user device have not been tested by the policy server 28 with respect to the accepted credential set) so that the device is no longer compliant with security policy. In the former case, with respect to the system 20, the user device 22 is no longer a risk to the network and should be given access to network resources 25 in network 24. In the latter cases, with respect to the system 20, the user device 22 may be susceptible to receiving and introducing a virus into the network 24.

In order to detect a posture change on a user device 22 and to make sure that the user device is still the same device 22 as was previously authorized, the data communications device 26 periodically polls the user device 22 using the posture update query. In the case where the data communications device 26 detects a change in the state of the user device 22, the data communications device 26 attempts to re-authorize the posture of user device 22 as explained in FIG. 1 (i.e. triggers the re-start of the full system process as described in FIG. 1). If this attempt is unsuccessful, the data communications device 26 may remove all access permissions for user device 22 to minimize the risk of virus or malicious content introduction by the user device 22 to the network 24.

Figure 4:
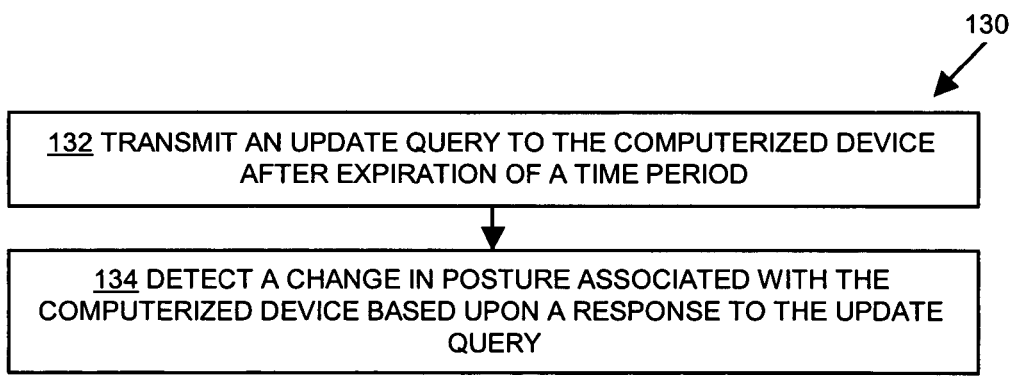
FIG. 4 illustrates a flow chart of a procedure performed by a data communications device of the system of FIG. 1, according to one embodiment of the invention.

FIG. 4: Data COMMS Device Status Query

FIG. 4 illustrates a flowchart 130 of a procedure performed by a data communications device 26 when querying the status of the user device 22.

In step 132, after the full challenge-response sequence has completed and the computerized device 22 has been authorized, for example, the data communications device 26 transmits a posture update query to the computerized device

22 after expiration of a time period. For example, in one arrangement, the data communications device 26 includes a timer 70. During operation, when the data communications device 26 applies an access instruction 48 for the user device 22, provision of such access initiates operation of the timer 70 such that a timer counts from a start time to a preset end time. After expiration of a preset time period (e.g., the time period between the end time and the start time), the timer 70 causes the data communications device 26 to transmit an posture update query to the computerized device 22 to ensure that its configuration has not changed since the last full challenge response sequence and that the user device is the same device that was last checked. In one arrangement, the posture update query challenges the user access device to demonstrate knowledge of a shared secret that was derived and shared during the full challenge-response sequence described in system operation shown in FIG. 1. Demonstration of the secret information can be produced by the posture agent 30 only, for example, by responding appropriately to a random challenge from the data communications device by hashing the random number in the challenge with the shared secret.

In step 134, the data communications device 26 detects a change in posture associated with the computerized device 22 based upon a response to the posture update query. The data communications device 26 interprets either an actual response or a lack of a response from the computerized device 22 to determine the state of the computerized device 22.

For example, assume that a first user device 22 establishes a connection with a network resource 25 in the network 24, via the data communications device 26. Further assume that prior to the data communications device 26 transmitting a posture update query to the first user device 22 (e.g., prior to expiration of a preset time period as measured by the timer 70) an operator replaces the first user device 22 with a second user device (e.g., where the configuration credentials 32 of second user device have not been tested or verified by the policy server 28 with respect to the accepted credential set 46). In such an arrangement, after the data communications device 26 transmits the posture update query to the second user device, the second user device is unable to interpret and respond to the posture update query because the state information (e.g., a hash of the original acceptable credentials 32) that is expected by the data communications device 26 will not be present on the substituted computerized device 22. The device 22 would most probably not respond. As such, a non-response to the posture update query as well as a subsequent attempted full posture check indicates to the data communications device 26 the connection of a potentially unverified user device 22 to the network 24. Based on the non-response, the data communications device 26 reduces network access privileges or terminates the connection between the user device 22 and the network resource 25 to reduce the risk of reception or transmission, by the network resources 25 of an unauthorized application from a "vulnerable" user device or a device susceptible to a virus. In this manner, periodic posture checking can be performed.

In another example, assume that a user device 22 establishes a connection with a network resource 25 in the network 24, via the data communications device 26. Further assume that, prior to the data communications device 26 transmitting a posture update query to the first user device 22 (e.g., prior to expiration of a preset time period as measured by the timer 70), an operator disables or reconfigures an anti-virus application associated with the user device 22. In such an arrangement, when the data communications device 26 transmits the posture update query to the user device 22, the user device 22 indicates the change in configuration of the operating system and anti-virus application to the data communications device 26 in a query response. When the data communications device reviews the query response and detects the change in posture, the data communications device 26 triggers a full posture credential challenge-response sequence as explained in system operation described in FIG. 1. Based on the results of the new posture check, the policy server 28 may apply new access instructions 48 and/or redirect access instructions 62 to the user device 22 that reduces network access privileges or terminates the connection between the user device and the network resource 25 to reduce the risk of reception, by the network resources 25 of an unauthorized application from a "vulnerable" user device or a device susceptible to a virus.

In another example, assume that a user device 22 establishes a connection with a network resource 25 in the network 24, via the data communications device 26. Further assume that the user device 22 is not deemed by the policy server 28 to be compliant with security policy and is given restricted access to network resources 25 sufficient only to remediate itself. Before the remediation is complete, the user device 22 will respond to posture update queries from the data communications device 22 in a way that indicates no posture change. However, once remediation has completed successfully, the posture agent 30 will indicate that the posture has changed on the next posture update query from the data communications device 26. In such an arrangement, when the data communications device 26 transmits the posture update query to the user device 22, the user device 22 indicates the change in configuration of the operating system and anti-virus application to the data communications device 26 in a query response. When the data communications device reviews the query response and detects the change in posture, the data communications device 26 triggers a full posture credential challenge-response sequence as explained in system operation described in FIG. 1. Based on the results of the posture check, the policy server 28 may apply new access instructions 48 to the user device 22 that increases network access privileges between the user device and the network resource 25 to enable normal network access.

Rather than relying only on the posture update query, the invention also allows the posture agent 30 to asynchronously request the data communications device 22 to re-initiate the challenge-response sequence for posture credentials from posture plug-ins 32, as described in FIG. 1, as soon as the posture agent is notified by any posture plug-in 32 that the posture has changed. The posture agent 30 determines from a posture plug-in 32 that the posture has changed using the posture plug-in API. The posture agent 30 determines that the posture has changed in one of two ways: the posture agent 30 periodically polls the installed posture plug-ins for a posture change, or the posture plug-in 32 asynchronously notifies the posture agent 30 as soon as it determines that the posture has changed. When the posture agent 30 learns of a posture change from one or more posture plug-ins 32, it sends a signaling request to the data communications device 22 to re-start the challenge-response sequence described in FIG. 1. When the data communications device 22 receives a request from the posture agent 30 to re-initiate the challenge-response sequence, it does so as explained in system operation described in FIG. 1. Based on the results of the posture check, the policy server 28 may apply new access instructions 48 to the user device 22 that increases or decreases network access privileges between the user device and the network resource 25.

Additionally, in one arrangement, the data communications device 26 periodically re-executes the sequence described with respect to FIG. 1 based on expiration of a preset time period. A timer associated with the data communication device 26, for example, initiates measurement of a time period after the data communication device 26 receives the access request 40 from the computerized device 22. In one arrangement, after a timer reaches the preset time period, the data communications device transmits to the computerized device 22 a challenge request 42, as part of the re-executed challenge response sequence of FIG. 1.

Figure 5:
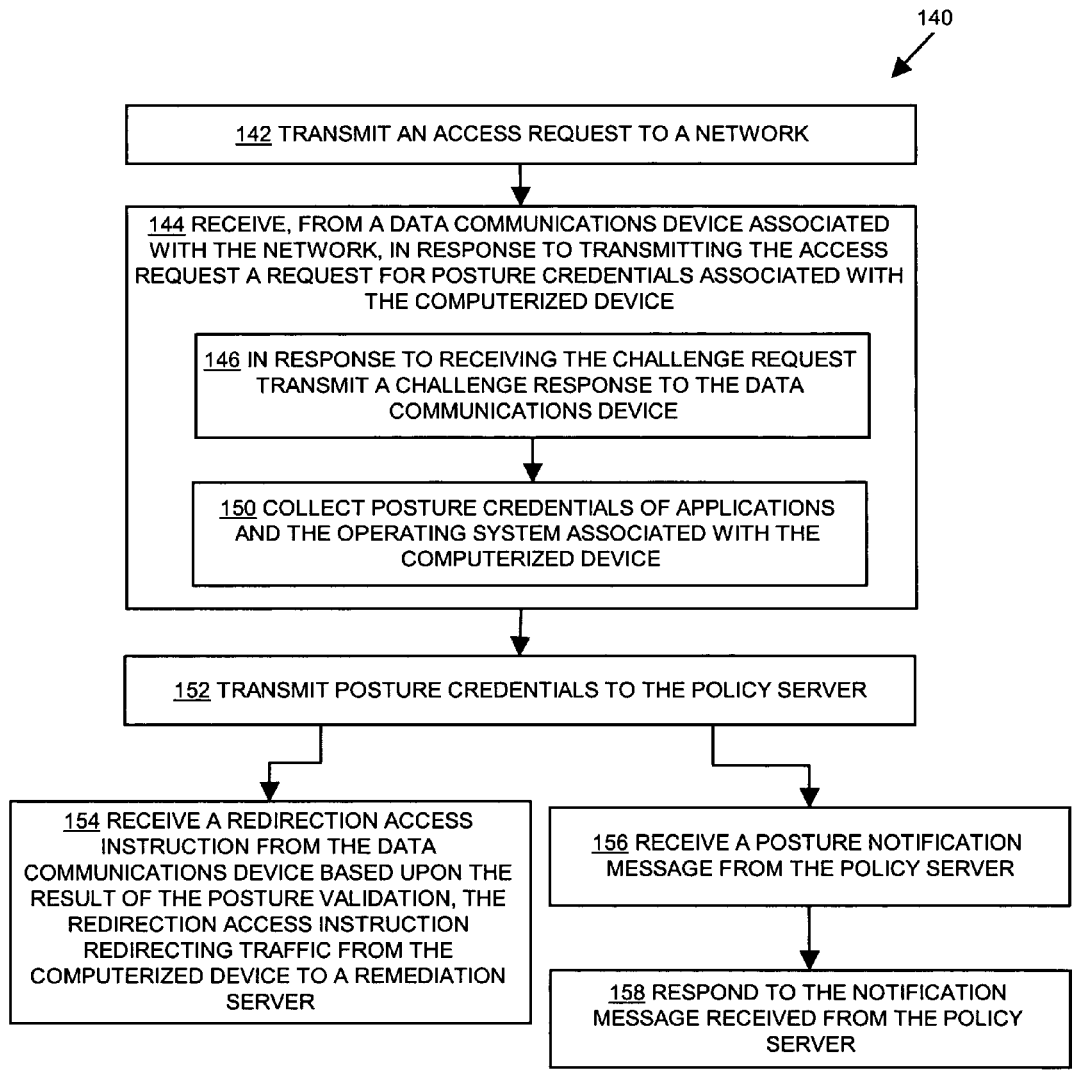
FIG. 5 illustrates a flow chart of a procedure performed by a computerized device of the system of FIG. 1, according to one embodiment of the invention.

FIG. 5: Posture Agent

As indicated above, the data communications device 26 plays a role in controlling a user device's 22 access to resources 25 in the network 24. The user device 22 works in conjunction with both the data communications device 26 and the policy server 28 in accessing the network resources 25.

FIG. 5 illustrates a flowchart 140 of a procedure performed by the computerized device 22 when accessing resources 25 in the network 24.

In step 142, the computerized device 22 transmits an access request 40 to a network 24. For example, the user device 22 transmits packets or an access request 40 into the network 24, such as a SYN packet or an 802.1x EAP Start message. The data communications device 26 intercepts the packets or access request 40 and, in response, transmits a request for posture credentials (e.g., an initial challenge request 42 as part of the challenge response sequence described in FIG. 2) to the computerized device 22.

In step 144, the computerized device 22 receives, from a data communications device 26 associated with the network, in response to transmitting the access request 40, a request for posture credentials associated with the computerized device 22. Steps 146 and 150 describe an example of procedures executed by the computerized device 22 when receives a response to the access request 40.

For example, the data communications device 26 transmits a challenge request 42 to a computerized device 22. In step 146, in response to receiving the challenge request 42, the computerized device 22 (e.g., posture agent 30) transmits a challenge response 43 to the data communications device 26. The data communications device 26 forwards the challenge response to the policy server 28. The policy server 28 then transmits one or more challenge requests to the posture agent 30 on computerized device 22 via the data communications device 26 to set up secure communications between the posture agent 30 and the policy server 28. Once secure communications have been established, the computerized device 22 receives one or more posture request 47, from the policy server 28 for posture credentials from specified posture plug-ins 32.

In step 150, the request (e.g., the sequence of challenge response requests) causes a posture agent 30 operating with the computerized device 22, to collect posture credentials 32 of applications and the operating system associated with the computerized device 22. As indicated above, the posture credentials collected from the posture plug-ins 32 of the user device 22 relate to a security posture (e.g., security status) of the user device 22. The security posture of the user device 22 indicates the user device's 22 ability to resist reception or transmission of malware (e.g., viruses), content (e.g., spam or data theft), or access by unauthorized users.

In step 152, the computerized device transmits posture credentials to the policy server 28. As indicated above, by providing posture credentials 32, such as via a posture response 44, to the data communications device 26 and, in turn, to the policy server 28, the user device 22 allows the system 20 to verify the security (e.g., security posture) of the user device 22 prior to connecting to the network 24. As such, the user device 22 operates in conjunction with the data communications device 26 and the policy server 28 to minimize the probability for the user device 22 to introduce an unauthorized application into the network 24, thereby infecting or causing malfunction of the network resources 25, or to receive malicious content from other sources.

FIG. 5 also illustrates additional steps performed by the computerized device 22 when accessing resources 25 in the network 24.

In step 154, the computerized device 22 receives a redirection access instruction 64 from the data communications device 26 based upon the result of the posture validation, the redirection access instruction redirecting traffic from the computerized device 22 to a remediation server 66. For example, as indicated above, the data communications device 26 redirects HTTP requests from the user device 22 to the remediation server 66 after the data communications device 26 receives access instructions 62 from the policy server 28. Based on the redirection, rather than establishing communications with the network resources 25, the user device 22 establishes a connection with the remediation server 66. The remediation server 66, in one arrangement, is configured to upgrade or provide up-to-date patches to applications, such as anti-virus applications, associated with the user device 22. The remediation server 66 acts, for example, to minimize the susceptibility of the user device 22 to an unauthorized application, such as a virus, thereby minimizing the potential for the user device 22 to receive malicious content or introduce an unauthorized application onto the network 24 at a later time.

In another example, the computerized device 22 displays the redirection access instruction. In such an example, the redirection access instruction informs a user as to the results of the posture validation, resulting network access, and any actions that may need to be performed for remediation purposes, thereby providing the user with access to the redirection access instruction. FIG. 5 also illustrates additional steps performed by the computerized device 22 based on the results of verifying the posture of the device 22 by the policy server 28.

In step 156, the computerized device 22 receives a posture notification message from the policy server 28. For example, in addition to determining the access instruction 48 that is downloaded to the data communications device 26, the policy server 28 may also send one or more notification messages to the user device 22 via the data communications device 26. Similar to the format of the posture credentials, the notification messages are also configured in an extensible messaging format, such as a Type-Length-Value (TLV) or an extensible markup language (XML) format on the policy server. The TLV and XML formats are well-defined, application-independent form for representing information or data. With the posture notification message formatted in the extensible messaging format, third-party manufacturers of posture plug-ins 32 can recognize the information contained in the notification messages and act on these notifications accordingly.

There are several forms of notification. A posture notification may indicate the result of the posture validation check (i.e. that the posture is compliant with security policy or non-compliant). The notification message may contain a text message for display to a user or for logging to a log file (e.g., messages to display to the user or a log or URL's of the remediation server 66 and any remediation actions to be performed). For example, in the case that a user device 22 is non-compliant, the message may be displayed to the user or written to a log file indicating that the device has been quarantined and needs to be remediated. The notification message may also include a link to a remediation server or the IP address of the remediation server 66 that a user may click on or an application on the user device 22 may process to remediate the user device 22 automatically. Notifications may be processed by the posture agent 30 or the posture agent may forward the notifications to the posture plug-ins 32 via the posture plug-in API.

In step 158, the computerized device 22 responds to the notification message received from the policy server 28. For example, in one arrangement, the computerized device 22 displays the notification message, in the form of a text message, to the user. In another arrangement, the computerized device 22 activates a link, associated with the notification message, to direct the computerized device 22 to the remediation server 66.

As indicated above, the data communications device 26 and user device 22 plays a role in controlling a user device's 22 access to resources 25 in the network 24. As described below, the policy server 28 works in conjunction with the data communications device 26 and the user device 22 in allowing user device 22 access to the network resources 25.

Figure 6:
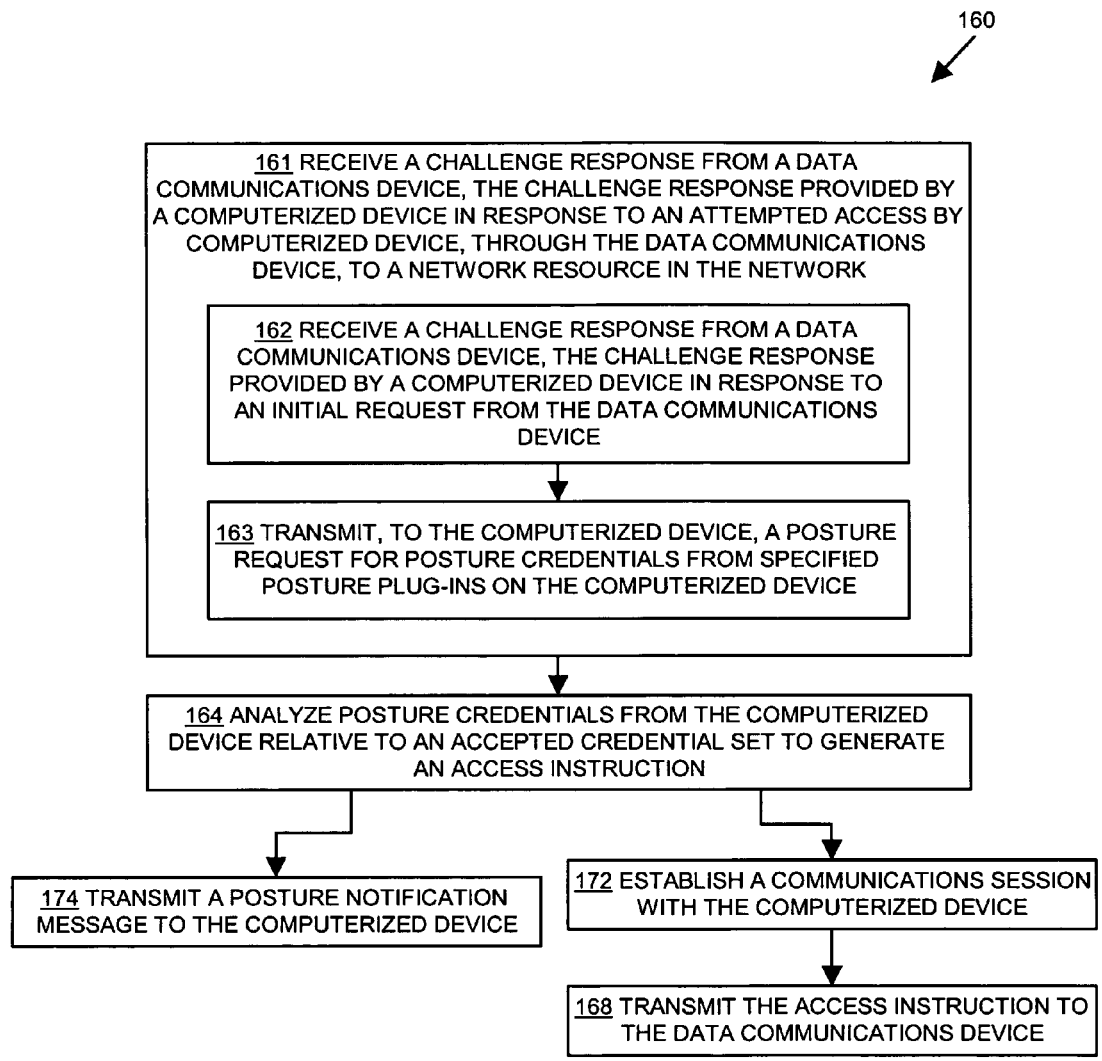
FIG. 6 illustrates a flow chart of a procedure performed by a policy server of the system of FIG. 1, according to one embodiment of the invention.

FIG. 6 illustrates a flowchart 160 of a procedure performed by the policy server 28 when controlling access to resources 25 in the network 24.

In step 161, the policy server 28 receives posture credentials from a data communications device, the posture credentials provided by a computerized device in response to an attempted access by the computerized device, through the data communications device, to a network resource in the network. In one arrangement, the policy server 68 receives the posture credentials as part of a challenge response sequence outlined in steps 162 and 163.

In step 162, the policy server 28 receives a challenge response 43 from a data communications device 26, the challenge response 43 provided by a computerized device 22 in response to an initial request from the data communications device 22, which is in turn in response to an attempted access by the computerized device 22, through the data communications device 26, to a network resource 25 in the network 24. In one arrangement, the policy server 28 then transmits one or more challenge requests 45 to the posture agent 30 on computerized device 22 via the data communications device 26 to set up secure communications between the posture agent 30 and the policy server 28.

In step 163, the policy server 28 transmits, to the computerized device 22, a posture request 47 for posture credentials from specified posture plug-ins 32 on the computerized device 22. The policy server 28 may also make one or more requests 49 to authenticate the computerized device 22 or the user of the computerized device 22 via the data communications device.

In step 164, the policy server 28 analyzing the posture credentials from the computerized device 22 relative to an accepted credential set 46 to generate an access instruction 48. For example, assume the posture credential information from posture plug-ins 32 indicates that the user device 22 is configured with an anti-virus application from a particular manufacturer. The policy server 28 reviews the accepted credential set 46 to detect the presence (e.g., a listing) of the anti-virus application from the particular manufacturer within the accepted credential set 46.

In one arrangement, the policy server 28 authenticates an identity of the computerized device 22 to generate an authentication result, as indicated above. The policy server 28 then compares the posture credentials from the computerized device 22 with an accepted credential set to generate a posture validation. The policy server 28 then maps the results of posture validation with the authentication result to generate an access instruction 48.

In one arrangement, the accepted credential set 46 is configured in an extensible messaging format, such as a Type-Length-Value (TLV) or an extensible markup language (XML) format. The TLV and XML formats are well-defined, application-independent form for representing information or data. With the accepted credential set 46 formatted in the extensible messaging format, as third-party manufacturers include information (e.g., updated software patch information, updated virus information) for inclusion within the accepted credential set 46, the policy server 28 can, in turn, recognize the information contained within the information regardless of the source (e.g., manufacturer) of the information.

In step 168, the policy server 28 transmits the network admission or access instruction 48 to the data communications device 26. The network admission instruction 48 directs the data communications device to either allow some level of network access or deny the computerized device 22 access (e.g., restrict access of the computerized device 22) to the resources 25 within the network 24. Assume, for example, that based upon the analysis the policy server 28 detects the presence of, or a listing of, the anti-virus application from the particular manufacturer within the accepted credential set 46. In such an example, the policy server 28 transmits an access instruction 48 to the data communications device 26 that directs the data communications device 26 to allow communications between the user device 22 and the resources 25 within the network 24. Assume, however, that based upon the analysis, the policy server 28 fails to detect the presence of, proper configuration, or timely execution of the anti-virus application from the particular manufacturer within the accepted credential set 46. In such an example, in one arrangement, the policy server 28 transmits a network admission instruction 48 to the data communications device 26 that directs the data communications device 26 to restrict or reject communications from the user device 22 to the resources 25 within the network 24.

In the above-described arrangement, the policy server 28 detects the real-time security posture or security state of a user device 22 (e.g., as indicated by the posture credentials 32) prior to providing the user device 22 with access to the network resources 25. By detecting the real-time security state of the user device 22, the policy server 28 aids in minimizing "vulnerable" user devices 22 (e.g., user devices 22 that are not configured with anti-virus or up-to-date anti-virus applications) from accessing the network 24. As such, the policy server 28 aids in minimizing the risk that the network 24 or network resources 25 become "infected" with malware carried by the "vulnerable" user device 22.

FIG. 6 illustrates additional steps performed by the policy server 28, prior to transmitting the access instruction 48, when controlling access to resources 25 in the network 24.

In step 172, the policy server 28 establishes a communications session with the computerized device 22. The policy server 28 establishes the communications session with the computerized device 22 based upon the results of the analysis step 164, described above.

As indicated above, the policy server 28 analyzes the posture credentials 32 of the computerized device 22 relative to the accepted credential set 46 to generate the access instruction 48 that indicates, to the data communications device 26, whether to allow or prevent communications between the computerized device 22 and the network resources 25. In one arrangement, in addition to asking for posture credentials 32, the policy server may also request the posture agent 30 for the identity of the user of the computer device 22 or the identity of the device itself and authenticate those identities through another sequence of challenge-responses using well-defined authentication methods e.g. EAP-MS-CHAPv2, EAP-GTC.

For example, assume the posture credentials 32 indicate, in part, an identity of the computerized device 22 (e.g., identifies the computerized device 22 as a user device or network administrator device, for example). When the policy server 28 analyzes the posture credentials 32 of the computerized device 22, the policy server 28 also determines the identity of the computerized device 22. Assuming the posture credentials 32 identify the computerized device 22 as a user (e.g., as opposed to a network administrator device), the policy server 28 restricts the computerized device's access, via the access instructions 48, to certain resources 25 within the network 24 (e.g., to public or "non-administrator" resources 25 within the network. In such an arrangement, the policy server 28 provides additional security to the network 24 based not only on the posture of the user device 22, but also depending on who the user of the device is and/or the device itself, e.g. whether the device is recognized as an organization's asset.

FIG. 6 also illustrates additional steps performed by the policy server 28 based on the results of analyzing the posture credentials from the computerized device 22 to verify the posture of the device 22.

In step 174, the policy server 28 transmits a posture notification message to the computerized device 22. For example, in addition to determining the access instruction 48 that is downloaded to the data communications device 26, the policy server 28 may also send one or more notification messages to the user device 22 via the data communications device 26. In one arrangement, the notifications (e.g., notification messages) provide. information regarding success of a network access attempt by the computerized device. Similar to the format of the posture credentials, the notification messages are also configured in an extensible messaging format, such as a Type-Length-Value (TLV) or an extensible markup language (XML) format on the policy server. The TLV and XML formats are well-defined, application-independent form for representing information or data. With the posture notification message formatted in the extensible messaging format, third-party manufacturers of posture plug-ins 32 can recognize the information contained in the notification messages and act on these notifications accordingly.

There are several forms of notification. A posture notification from the policy server 68 may indicate the result of the posture validation check (i.e. that the posture is compliant with security policy or non-compliant). The notification message may contain a text message for display to a user or for logging to a log file. For example, in the case that a user device 22 is non-compliant, the message, transmitted by the policy server 68 may be displayed to the user or written to a log file indicating that the device has been quarantined and needs to be remediated. The notification message may also include a link to a remediation server or the IP address of the remediation server 66 that a user may click on or an application on the user device 22 may process to remediate the user device 22 automatically. Notifications may be processed by the posture agent 30 or the posture agent may forward the notifications to the posture plug-ins 32 via the posture plug-in API.

As indicated above, the data communications device 26 plays a role in controlling a user device's 22 access to resources 25 in the network 24. Where a posture agent 30 is installed on the user device 22, the user device 22 works in conjunction with both the data communications device 26 and the policy server 28 in accessing the network resources 25. There are cases, however, where a posture agent 30 may not be installed on the user device 22. This may be because the posture agent 30 does not exist for the operating system on the user device 22. The system 20 allows access instructions to be downloaded from the policy server 28 to a data communications device 26 even if the user device 22 does not have a posture agent 22.

Figure 7:
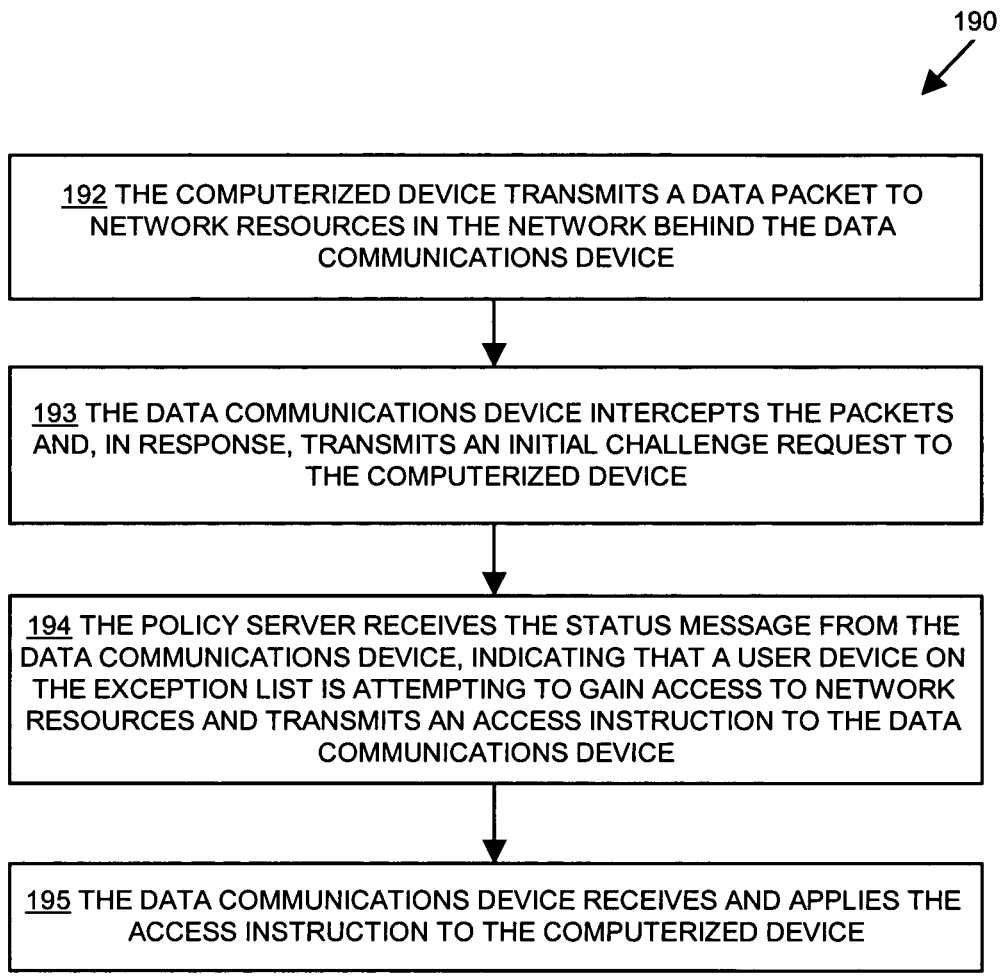
FIG. 7 illustrates a flow chart of a procedure performed by the system of FIG. 1 when the computerized device attempts to access resources in the network, according to one embodiment of the invention.

FIG. 7 illustrates a flowchart 190 of a procedure performed by the system 20 when the computerized device 22 attempts to access resources 25 in the network 24.

In step 192, the computerized device 22 transmits a data packet 40 to network resources 25 in the network 24 behind the data communications device 22. For example, the user device 22 transmits packets 40, such as a SYN packet to a network resource 25 during a handshaking procedure initiated by the user device 22.

In step 193, the data communications device 26 intercepts the packets and, in response, transmits an initial challenge request 42 to the computerized device 22. In the case where no posture agent 30 is present on the device, the computerized device 22 does not respond to the challenge request 42.

After attempting several times, in step 193 the data communications device 26 detects a non-responsive state of the computerized device 22 and sends a status message to the policy server 28. In one arrangement, the status message indicates the IP address and/or MAC address of the non-responsive host (e.g., computerized device 22). The policy server 28 may maintain a table of computerized devices 22 that do not have a posture agent 30 installed, (e.g. an exception list) along with the allowed access for each device.

In step 194, the policy server 28 receives the status message from the data communications device 22, indicating that a user device 22 on the exception list is attempting to gain access to network resources 25, and transmits an access instruction 48 to the data communications device 26. In one arrangement, the access instruction is based on the IP address of MAC address of the computerized device 22.

In step 195, the data communications device 22 receives and applies the access instruction 48 to the computerized device 22. The access instruction 48 may permit the user device 22 to access all or a restricted set of network resources 25 in the network 24. Alternately, the access instruction can deny the computerized device access to the network resources 25.

If the computerized device 22 is not in the exception list, the policy server 28 may be configured to use other mechanisms available in the network 24 to find out more information about the device. In one arrangement, the policy server 28 may request an audit server that scans for vulnerabilities on computerized devices 22 using mechanisms that do not require a posture agent 30 on the computerized device 22. Such mechanisms may be slower and less accurate than if a posture agent 30 is installed on the user device 22, but still provides some information that a policy server 28 can use, (e.g. operating system type, operating system version) to determine the level of access to apply to the computerized device.

Based on the information returned by the audit server, the policy server 28 applies the appropriate access instruction to the data communications device 26 depending on the level of compliance to security policy. If the user device 22 complies with security policy, in such an example, the policy server 28 transmits an access instruction 48 to the data communications device 26 that directs the data communications device 26 to allow communications between the user device 22 and the resources 25 within the network 24. Assume in another example, however, that based upon the comparison of the information returned by the audit server with security policy configured on the policy server 28, the policy server 28 determines that the user device 22 is not compliant. In such an example, in one arrangement, the policy server 28 transmits an access instruction 48 to the data communications device 26 that directs the data communications device 26 to restrict or completely reject communications from the user device 22 to the resources 25 within the network 24.

In the above-described arrangement, the policy server 28 continues to detect the real-time security posture or security state of a user device prior to providing the user device 22 with access to the network resources 25 even if the user device 22 does not have a posture agent 22 installed. Alternatively, the policy server has a pre-configured list of user devices 22 that are known not to have the posture agent installed and are deemed to present a low risk to the network. By detecting the real-time security state of the user device 22 using alternative mechanisms or through the use of an exception list, the policy server 28 aids in minimizing "vulnerable" user devices 22 from accessing the network 24. As such, the policy server 28 aids in minimizing the risk that the network 24 or network resources 25 become "infected" with malware carried by the "vulnerable" user device 22.

Figure 8:
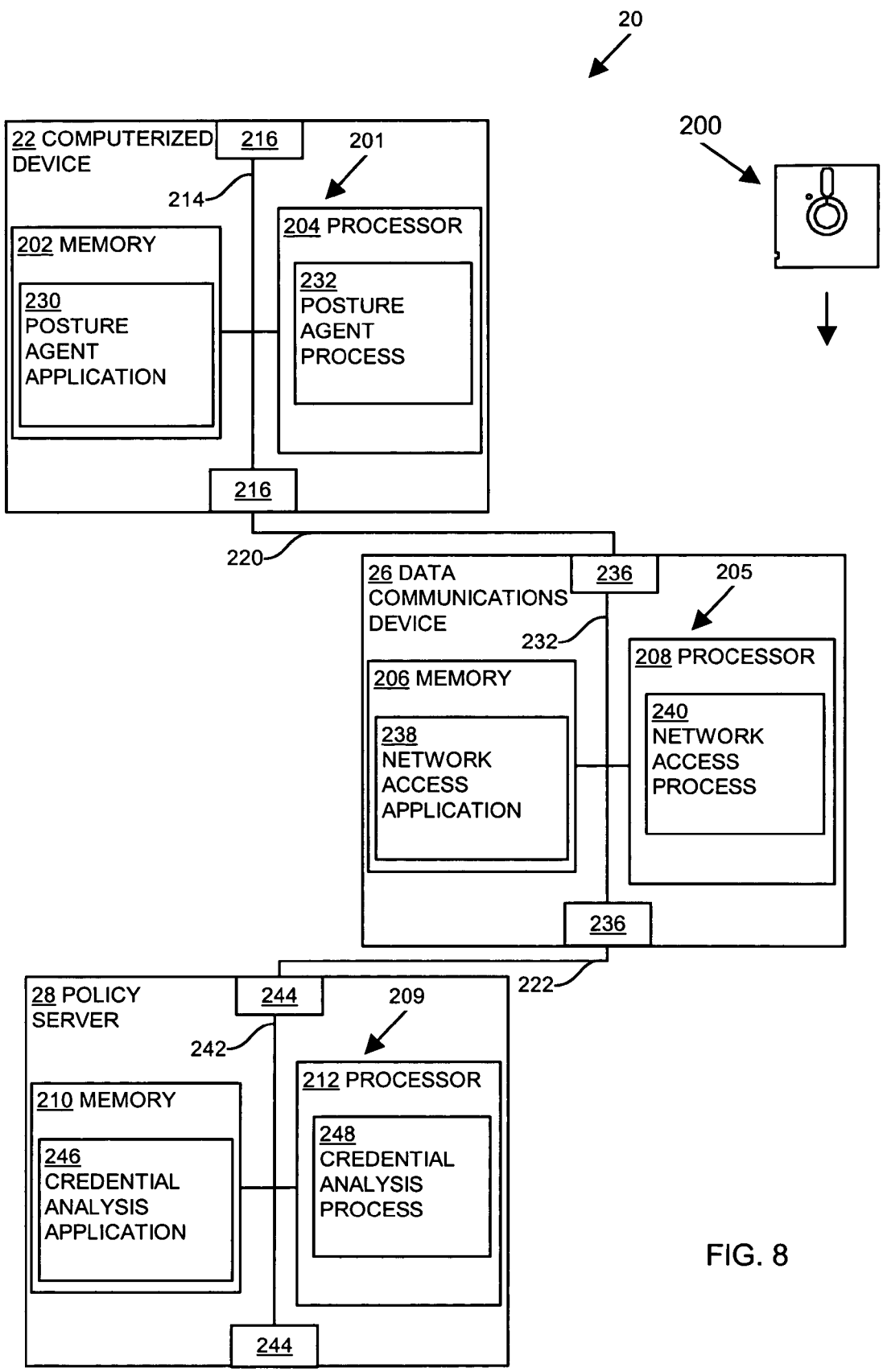
FIG. 8 illustrates a configuration of the system of FIG. 1, according to one embodiment of the invention.

FIG. 8 illustrates a more detailed architecture of the computerized device 22, data communications device 26, and policy server 28 of the data communications system 20.

The computerized device 22 includes a controller 201 formed of a memory 202 and a processor 204. The data communications device 26 includes a controller 205 formed of a memory 206 and a processor 208. The policy server 28 includes a controller 209 formed of a memory 210 and a processor 212. A computer program product 200 includes an application or logic instructions that are loaded into the computerized device 22, data communications device 26, and policy server 28 to configure the devices 22, 24, 26 to operate as part of the data communications system 20, described above.

The computerized device 22, in this example, includes an interconnection mechanism 214 such as a data bus and/or other circuitry that interconnects the memory 202 and the processor 204, and one or more communications interfaces 216. The communication interface 216 connects with the data communications device 26 via connections 220.

The memory 202 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 202 is encoded with logic instructions (e.g., software code) and/or data that form a posture agent application 230 configured according to embodiments of the invention. In other words, the posture agent application 230 represents software code, instructions and/or data that represent or convey the processing logic steps and operations as explained herein and that reside within memory or storage or within any computer readable medium accessible to the computerized device 22.

The processor 204 represents any type of circuitry or processing device such as a central processing unit, microprocessor or application-specific integrated circuit that can access the posture agent application 230 encoded within the memory 202 over the interconnection mechanism 214 in order to execute, run, interpret, operate or otherwise perform the posture agent application 230 logic instructions. Doing so forms the posture agent process 232. In other words, the posture agent process 232 represents one or more portions of the logic instructions of posture agent application 230 while being executed or otherwise performed on, by, or in the processor 204 within the computerized device 22. The computerized device 22 in FIG. 1 collectively represents either one or both of the posture agent application 230 and the posture agent process 232.

The data communications device 26, in this example, includes an interconnection mechanism 232 such as a data bus and/or other circuitry that interconnects the memory 206 and the processor 208, and one or more communications interfaces 236. The communication interface 236 connects with the computerized device 22 via connection 220 and with the policy server 38 via connection 222.

The memory 206 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 206 is encoded with logic instructions (e.g., software code) and/or data that form a network access application 238 configured according to embodiments of the invention. In other words, the network access application 238 represents software code, instructions and/or data that represent or convey the processing logic steps and operations as explained herein and that reside within memory or storage or within any computer readable medium accessible to the data communications device 26.

The processor 208 represents any type of circuitry or processing device such as a central processing unit, microprocessor or application-specific integrated circuit that can access the network access application 238 encoded within the memory 206 over the interconnection mechanism 232 in order to execute, run, interpret, operate or otherwise perform the network access application 238. Doing so forms the network access process 240. In other words, the network access process 240 represents one or more portions of the logic instructions of the network access application 238 while being executed or otherwise performed on, by, or in the processor 204 within the data communications device 26. The data communications device 26 in FIG. 1 collectively represents either one or both of the network access application 238 and the network access process 240.

The policy server 28, in this example, includes an interconnection mechanism 242 such as a data bus and/or other circuitry that interconnects the memory 210 and the processor 212, and one or more communications interfaces 244. The communication interface 244 connects with the data communications device 26 via connection 222.

The memory 210 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 210 is encoded with logic instructions (e.g., software code) and/or data that form a credential analysis application 246 configured according to embodiments of the invention. In other words, the credential analysis application 246 represents software code, instructions and/or data that represent or convey the processing logic steps and operations as explained herein and that reside within memory or storage or within any computer readable medium accessible to the policy server 28.

The processor 242 represents any type of circuitry or processing device such as a central processing unit, microprocessor or application-specific integrated circuit that can access the credential analysis application 246 encoded within the memory 210 over the interconnection mechanism 242 in order to execute, run, interpret, operate or otherwise perform the credential analysis application 246. Doing so forms the credential analysis process 248. In other words, the credential analysis process 248 represents one or more portions of the logic instructions of the credential analysis application 246 while being executed or otherwise performed on, by, or in the processor 212 within the policy server 28. The policy server 28 in FIG. 1 collectively represents either one or both of the credential analysis application 246 and the credential analysis process 248.

While this invention has been particularly shown and described with references to preferred embodiments thereof, it will be understood by those skilled in the art that various changes in form and details may be made therein without departing from the spirit and scope of the invention as defined by the appended claims. As an example, in one embodiment as described above, the user device 22 transmits the challenge response to the data communications device where the challenge response includes configuration credentials used by the policy server. Such description is given by way of example only. In another arrangement, the challenge response causes the policy server 28 to establish direct communications with the user device 22, for example via a tunnel over which an EAP session is established to further query the device 22. The policy server 28 then presents a query to the posture agent 30 of the user device requesting the posture credentials. The posture agent 30 obtains the posture credentials associated with the user device 22 and transmits the posture credential information to the policy server over the communication session. In this manner, the initial challenge request 42 can request limited posture information 32, and if the policy server 28 deems it necessary, further posture information can be obtained later.

For example, as described above, the user device 22 includes sets of configuration credentials 32, also referred to hereinafter as "posture plug-ins". Each posture plug-in 32 indicates a security posture with respect to a particular manufacturer's application (e.g., security status, setting, value, active applications, or other configuration data) of the user device 22 with respect to one or more security vulnerabilities of the device. Such description is by way of example only. In one arrangement plug-ins represent an embodiment for the transmission of configuration information from the operating system and local applications associated with a user device 22 to a posture agent.

What is claimed is:

1. A computer-implemented method to control access to resources in a network by using an intercepting device, a policy server, and a remediation server and based on security posture credentials and access instructions, the computer-implemented method comprising:

intercepting, by the intercepting device, one or more messages sent by a computerized device requesting access to one of the resources in the network, the intercepting device comprising a data communications device;

prior to granting the computerized device with the requested access to the network, and in response to intercepting the one or more messages sent by the computerized device, selecting, based on the resources for which access is requested, one or more challenge requests to provide to a posture program, whereupon the posture program evaluates a current security state of an application or component of the computing device in order to generate a security posture credential representing a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving the security posture credential, forwarding the security posture credential to the policy server, whereupon the policy server analyzes the security posture credential relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions for the remediation server to perform in order to bring the computerized device into compliance with the security policy; and applying the redirect access instruction at the intercepting device by operation of one or more computer processors, to communications traffic originating from the computerized device and destined for resources within the network, in order to grant the computerized device with access to the remediation server without including access to the resources in the network;

wherein upon determining the posture validation result indicates that the computerized device satisfies the requirements of the security policy, or upon successful completion of the one or more remedial actions to bring the computerized device into compliance with the security policy, the policy server generates a grant access instruction applicable by the intercepting device to grant the computerized device with access to the resources in the network;

wherein upon failure of the one or more remedial actions to bring the computerized device into compliance with the security policy, the policy server generates a restrict access instruction applicable by the intercepting device to limit or deny access to the resources in the network, wherein the restrict access instruction is not applicable by the intercepting device to restrict routing of any communications traffic destined for locations outside the network.

2. The computer-implemented method of claim 1, wherein the restrict access instruction is applicable to restrict entry of the communications traffic to the network based upon an address associated with the computerized device.

3. The computer-implemented method of claim 1, wherein the restrict access instruction is applicable to restrict entry of the communications traffic to the network based upon a communication protocol associated with the computerized device.

4. The computer-implemented method of claim 1, further comprising initiating a secure communication between the policy server and computerized device.

5. The computer-implemented method of claim 1, wherein the restrict access instruction is applicable to restrict entry of the communications traffic to the network based upon an address associated with the computerized device and an address associated with the resources in the network to restrict access to the resources in the network by the computerized device.

6. The computer-implemented method of claim 1, further comprising periodically detecting, receiving and forwarding the security posture credentials, receiving the restrict access instruction, and applying the restrict access instruction based on expiration of a preset time period.

7. The computer-implemented method of claim 1, wherein the security posture credentials include one or more affirmative descriptions of the application or component on the computerized device, wherein the one or more affirmative descriptions associated with the at least one application on the computerized device comprises one or more of, an antivirus software version, an antivirus definition version, a firewall software version, an operating system version, a malware protection software version, an operating system patch version, and an occurrence time of the most recent antivirus scan.

8. The computer-implemented method of claim 1, wherein applying the redirect instruction to direct traffic to the remediation server to reconfigure the computerized device comprises upgrading the computerized device according to the security posture credentials of the computerized device that fail analysis by the policy server relative to the accepted credential set.

9. The computer-implemented method of claim 1, wherein the security posture credentials include one or more affirmative descriptions of the application or component on the computerized device and represents the security state of the computerized device, wherein the security posture credentials do not specify any posture validation result for the computerized device, wherein the redirect access instruction is distinct from the posture validation result, wherein the computerized device, the intercepting device, the policy server, and the remediation server are distinct systems operatively connectable to one another via the network.

10. The computer-implemented method of claim 9, wherein the grant access instruction specifies which network resources the computerized device may access, wherein the security posture credential is collected and transmitted by the posture agent, wherein the redirect access instruction contains a network address of the remediation server as part, not all, of the access instruction, wherein each resource comprises a network resource;

wherein the posture validation result is automatically determined without additional intervention by the intercepting device, without additional intervention by the remediation server, and without additional intervention by the computerized device;

wherein the redirect access instruction is automatically generated without additional intervention by the intercepting device and without additional intervention by the remediation server.

11. The computer-implemented method of claim 10, wherein the one or more messages are automatically intercepted without additional intervention by the policy server and without additional intervention by the remediation server;

wherein the security posture credential is automatically generated without additional intervention by the intercepting device, without additional intervention by the policy server, and without additional intervention by the remediation server;

wherein the access instruction is automatically applied at the intercepting device without additional intervention by the remediation server, without additional intervention by the policy server, and without additional intervention by the computerized device;

wherein the computerized device is automatically reconfigured based on the redirect access instruction, without additional intervention by the intercepting device, without additional intervention by the policy server, and without additional intervention by the computerized device.

12. The computer-implemented method of claim 11, wherein the restrict access instruction is only applied to communications traffic originating from the computerized device and destined for resources within the network to restrict routing of the communications traffic within the network, wherein the restrict access instruction is not applied to restrict routing of the communications traffic destined for locations outside the network.

13. The computer-implemented method of claim 12, further comprising, prior to establishing a configured network state granting the computerized device with the requested access to the network:

applying the redirect access instruction by transmitting a redirection message to the computerized device in order to redirect traffic from the computerized device destined for resources within the network to the remediation server;

wherein the remediation server is configured to automatically reconfigure the computerized device in order to bring the security posture credentials of the computerized device into compliance with the accepted credential set by performing the one or more remedial actions specified in the redirect access instruction.

14. The computer-implemented method of claim 13, wherein the computer-implemented method further comprises:

responsive to an update to the accepted credential set after the computerized device is granted with access to the resources in the network, transmitting a posture update query by the intercepting device to the computerized device;

receiving, from the posture program, a posture update response to the posture update query;

forwarding the posture update response by the intercepting device to the policy server, whereupon the policy server analyzes the posture update response relative to the updated, accepted credential set in order to determine an updated posture validation result for the computerized device and generates an updated access instruction based on the updated posture validation result, wherein the updated access instruction does not include any redirect access instruction; and receiving, from the policy server, the updated access instruction, whereupon the intercepting device applies the updated access instruction to communications traffic originating from the computerized device and destined for resources within the network.

15. The computer-implemented method of claim 14, wherein the one or more affirmative descriptions associated with the at least one application on the computerized device includes:

(i) an antivirus software version;
(ii) an antivirus definition version;
(iii) a firewall software version;
(iv) an operating system version;
(v) a malware protection software version;
(vi) an operating system patch version; and
(vii) an occurrence time of the most recent antivirus scan.

16. The computer-implemented method of claim 15, where applying the redirect instruction to direct traffic to the remediation server to reconfigure the computerized device comprises upgrading the computerized device according to the security posture credential of the computerized device that fails analysis by the policy server relative to the accepted credential set, wherein the computer-implemented method further comprises:
   in response to a request from the policy server, re-collecting the posture credential from the posture program; and
   forwarding the re-collected posture credential to the policy server, wherein the policy server performs a first reassessment of the re-collected posture credential in order to determine whether the re-collected posture credential indicates the computerized device satisfies updated requirements of the security policy for accessing the resources.

17. The computer-implemented method of claim 16, further comprising:
   receiving a first updated message from the policy server as a result of the first reassessment; and
   in respective instances, and responsive to receiving the first updated message:
      (i) continuing to forward the network received from the computerized device traffic towards the resources; and
      (ii) removing the records on the routing device indicating the computerized device is authorized to access the resources.

18. The computer-implemented method of claim 17, further comprising:
   after a specified validity period expires, re-collecting the posture credential from the posture program;
   forwarding the re-collected posture credential to the policy server, wherein the policy server performs a second reassessment of the re-collected posture credential to determine whether the re-collected posture credential indicates the computerized device continues to satisfy requirements of the security policy for accessing the resources.

19. The computer-implemented method of claim 17, further comprising:
   receiving a second updated message from the policy server as a result of the second reassessment; and
   in respective instances, and responsive to receiving the second updated message:
      (i) continuing to forward the network received from the computerized device traffic towards the resources; and
      (ii) removing the records on the routing device indicating the computerized device is authorized to access the computerized resource;
   wherein the remediation server hosts resources needed to update the then-current configuration state of the one or more components on the computerized device in order to satisfy the requirements of the security policy;
   wherein access to the resources in the network is controlled by using the intercepting device, the policy server, and the remediation server and based on the security posture credential and the redirect access instruction, in order to restrict one or more computerized devices from accessing and infecting one or more other computerized devices in the network with worms and viruses.

20. The computer-implemented method of claim 19, wherein the computer-implemented method further comprises authenticating a user of the computerized device by the policy server in order to automatically generate an authentication result, without additional intervention by the intercepting device, without additional intervention by the remediation server, and without additional intervention by the computerized device; wherein the grant access instruction is generated by mapping the posture validation result with the authentication result, wherein the policy server is further configured to:
   receive identity information of the user; and
   determine an access policy based on both the posture validation result and identity information;
   wherein the access policy is applied to restrict access to the resources in the network.

21. The computer-implemented method of claim 20, wherein the network traffic includes a packet encapsulating a Transmission Control Protocol (TCP) synchronize (SYN) connection request and has a source Internet Protocol (IP) address not authorized to access the resources in the records of the resources;
   wherein the posture validation result and the identity information are securely transmitted using Extensible Authentication Protocol (EAP), wherein the user is authenticated using a predefined protocol selected from EAP Microsoft Challenge-Handshake Authentication Protocol (EAP-MS-CHAP) and EAP Generic Token Card (EAP-GTC);
   wherein the posture plug-in is configurable in an Extensible Markup Language (XML) format;
   wherein the traffic redirected to the remediation server comprises Hypertext Transfer Protocol (HTTP) traffic.

22. The computer-implemented method of claim 21, wherein the posture validation result is determined as a result of a predefined sequence of messages transmitted among the computerized device, the intercepting device, and the policy server, the predefined sequence of messages including, ordered from first-in-time to last-in-time:
   (i) an access request;
   (ii) an initial challenge request;
   (iii) a challenge response;
   (iv) a subsequent challenge request;
   (v) a posture request; and
   (vi) a posture response.

23. The computer-implemented method of claim 22, wherein:
   (i) the grant access instruction directs the intercepting device to permit communications between the computerized device and the resources;
   (ii) the restrict access instruction in a first instance directs the intercepting device to limit communications between the computerized device and the resources to specified network addresses, protocols, and ports; and
   (iii) the restrict access instruction in a second instance directs the intercepting device to reject communications between the computerized device and the resources.

24. The computer-implemented method of claim 23, wherein additional types of security posture credentials are obtainable via additional posture plug-ins and without requiring reinstallation of any posture agent on the computerized device;
  wherein the posture agent operates as an extensible policy broker that fields posture requests from the policy server and returns security posture credentials to the policy server based on responses from the security posture plugin;
  wherein the posture agent further operates as a broker that delivers notifications to the posture plug-ins from the posture server in response to the posture validation result, at least one notification of which indicates the posture validation result, wherein the at least one notification is output for display to the user and written to a log file.

25. The computer-implemented method of claim 24, wherein the posture validation result comprises a first posture validation result, wherein the policy server is configured to automatically determine a second posture validation result, different from the first posture validation result, that the computerized device is brought into compliance with the accepted credential set;
  wherein the second posture validation result is determined without additional intervention by the intercepting device, without additional intervention by the remediation server, and without additional intervention by the computerized device;
  wherein the posture plug-in is configured to notify the posture agent of any security posture change of the computerized device, via a posture plug-in application programming interface (API), in order to re-initiate the predefined sequence of messages.

26. The computer-implemented method of claim 25, wherein the records comprise an exception list, wherein the computerized device comprises a first computerized device, wherein a third computerized device is exempted from providing posture credentials and exempted from undergoing any posture validation, upon determining that the third computerized device is specified on the exception list, wherein the first and second computerized devices are not specified on the exception list, wherein the first, second, and third computerized devices are distinct devices; wherein the predefined sequence of messages is additionally used in order to:
  (i) authenticate an identity of the user; and
  (ii) authenticate an identity of the computerized device;
  wherein the grant access instruction is determined based on the posture validation result, the authenticated identity of the user, and the authenticated identity of the computerized device;
  wherein the computer-implemented method further comprises:
  maintaining a table of computerized devices, the table comprising, for each computerized device:
    (i) an identifier of the respective computerized device;
    (ii) a flag specifying whether the respective computerized device has any posture agent installed; and
    (iii) a permitted access level for the respective computerized device.

27. The computer-implemented method of claim 1, wherein the posture validation result is determined without additional intervention by the intercepting device, without additional intervention by the remediation server, and without additional intervention by the computerized device, wherein the redirect access instruction is generated without additional intervention by the intercepting device and without additional intervention by the remediation server.

28. The computer-implemented method of claim 1, wherein the security posture credential includes one or more affirmative descriptions of the application or component on the computerized device and represents the security state of the computerized device, wherein the security posture credential does not specify the posture validation result for the computerized device.

29. A data communications device to control access to resources in a network by operating, as an intercepting device, in conjunction with a policy server and a remediation server, and based on security posture credentials and access instructions, the data communications device comprising:
  at least one communications interface;
  a controller; and
  an interconnection mechanism coupling the at least one communications interface and the controller;
  wherein the controller is configured to:
    intercept a request for access sent from a computerized device, through the data communications device, to a network resource in the network;
    prior to granting the computerized device with the requested access to the network resource, and in response to intercepting the request for access, select, based on the resources for which access is requested, one or more challenge requests to provide to a posture program, whereupon the posture program evaluates a current security state of an application or component of the computing device in order to generate a security posture credential representing a current security state of the computerized device, wherein the posture program comprises at least one of: (i) a posture agent executing on the computerized device; (ii) a posture plug-in executing on the computerized device; and (iii) an audit server operatively connected to the computerized device;
    subsequent to receiving, from one or more of the plurality of security posture plug-ins, the security posture credential, forward the security posture credential to the policy server, whereupon the policy server analyzes the security posture credential relative to an accepted credential set representing requirements of a security policy for accessing the resources, in order to determine a posture validation result indicating whether the computerized device satisfies the requirements of the security policy;
    wherein upon determining the posture validation result indicates that the computerized device does not satisfy the requirements of the security policy, the policy server generates a redirect access instruction specifying one or more remedial actions for the remediation server to perform in order to bring the computerized device into compliance with the security policy; and
    apply the redirect access instruction at the intercepting device to network communications traffic originating from the computerized device and destined for resources within the network in order to grant the computerized device with access to the remediation server without including access to the resources in the network; and
  wherein upon determining the posture validation result indicates that the computerized device satisfies the requirements of the security policy, or upon successful completion of the one or more remedial actions to bring the computerized device into compliance with the security policy, the policy server generates a grant access instruction applicable by the intercepting device to grant the computerized device with access to the resources in the network;

wherein upon failure of the one or more remedial actions to bring the computerized device into compliance with the security policy, the policy server generates a restrict access instruction applicable by the intercepting device to limit or deny access to the resources in the network, wherein the restrict access instruction is not applicable by the intercepting device to restrict routing of any communications traffic destined for locations outside the network.

30. The data communications device of claim 29, wherein the access instruction is applicable to restrict entry of the communications traffic to the network based, at least in part, upon an address associated with the computerized device.

31. The data communications device of claim 29, wherein the access instruction is applicable to restrict entry of the communications traffic to the network based, at least in part, upon a communication protocol associated with the computerized device.

32. The data communication device of claim 29, wherein the controller is configured to initiate a secure communication between the policy server and computerized device prior to the computerized device communicating the security posture credentials.

33. The data communication device of claim 29, wherein the restrict access instruction is applicable to restrict entry of the communications traffic to the network based upon an address associated with the computerized device and an address associated with the resources in the network to restrict access to the resources in the network by the computerized device.

34. The data communication device of claim 29, wherein the controller is configured to periodically perform the steps of detecting, receiving and forwarding the security posture credentials, receiving the restrict access instruction, and applying the restrict access instruction based on expiration of a preset time period.

35. The data communications device of claim 29, wherein the security posture credentials include one or more affirmative descriptions of the application or component on the computerized device, wherein the one or more affirmative descriptions associated with the at least one application on the computerized device comprises one or more of, an antivirus software version, an antivirus definition version, a firewall software version, an operating system version, a malware protection software version, an operating system patch version, and an occurrence time of the most recent antivirus scan.

36. A non-transitory computer-readable medium including computer program logic encoded thereon that, when performed on a controller in a data communications device having a coupling to at least one communications interface, performs an operation to control access to resources in a network by the data communications device acting, as an intercepting device, in conjunction with a policy server and a remediation server and based on security posture credentials and access instructions, the operation comprising:

intercepting, by the intercepting device, an attempted access sent from a computerized device, through the data communications device, to a network resource in the network;

prior to granting the computerized device with the requested access to the network resource, and in response to intercepting the attempted access, selecting, based on the resources for which access is requested, one or more challenge requests to provide to a posture program, whereupon the posture program evaluates a current security state of an application or component of the computing device in order to generate a security posture credential representing a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving, from one or more of the plurality of security posture plug-ins, the security posture credential, forwarding the security posture credential to the policy server, whereupon the policy server analyzes the security posture credentials relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions for the remediation server to perform in order to bring the computerized device into compliance with the security policy; and applying the redirect access instruction at the intercepting device by operation of one or more computer processors when executing the computer program logic, to network communications traffic originating from the computerized device and destined for resources within the network in order to grant the computerized device with access to the remediation server without including access to the resources in the network; and wherein upon determining that the posture validation result indicates that the computerized device satisfies the requirements of the security policy, or upon successful completion of the one or more remedial actions to bring the computerized device into compliance with the security policy, the policy server generates a grant access instruction applicable by the intercepting device to grant the computerized device with access to the resources in the network;

wherein upon failure of the one or more remedial actions to bring the computerized device into compliance with the security policy, the policy server generates a restrict access instruction applicable by the intercepting device to limit or deny access to the resources in the network, wherein the restrict access instruction is not applicable by the intercepting device to restrict routing of any communications traffic destined for locations outside the network.

37. A computer-implemented method to control access to computing resources in a network, by using a routing device, a policy server, and a remediation server and based on security posture credentials and remediation attributes, the computer-implemented method comprising:

receiving, by the routing device connected to the network, from a computing device connected to the network, network traffic directed to a computing resource available over the network;

in response, collecting, from a posture program, a security posture credential indicating a current configuration state of one or more components on the computing device, wherein the posture program comprises at least one of: (i) a posture agent executing on the computing device; (ii) a posture plug-in executing on the computing device; and (iii) an audit server operatively connected to the computing device;

forwarding the security posture credential collected from the computing device to the policy server by operation of one or more computer processors, wherein the policy server performs an initial evaluation of the security posture credential of the computing device in order to determine a posture validation result indicating whether the computing device satisfies requirements of a security policy for accessing the computing resource;

upon receiving a message from the policy server indicating that the security posture credential does not satisfy requirements of the security policy, redirecting access by:

forwarding one or more remediation attributes to the remediation server to update, based on the one or more remediation attributes, the then current configuration state of the one or more components on the computing device in order to satisfy the requirements of the security policy; and forwarding network traffic from the computing resource towards the remediation server without granting access to the computing resource in the network; and upon receiving a message from the policy server indicating that the security posture credential satisfies the requirements of the security policy, or upon receiving a message from the remediation server indicating that the then current configuration state was successfully updated, granting access by:

forwarding network traffic received from the computing device towards the computing resource; and updating records on the routing device in order to indicate the computing device is authorized to access the computing resource;

wherein upon receiving a message from the remediation server indicating that the then current configuration state was not successfully updated, the routing device limits or denies access to the computing resource without limiting or denying any communications traffic destined for locations outside the network.

38. The computer-implemented method of claim 37, further comprising:

in response to a request from the policy server, re-collecting the posture credential from the posture program;

forwarding the re-collected posture credential to the policy server, wherein the policy server performs a reassessment of the re-collected posture credential to determine whether the re-collected posture credential indicates the computing device satisfies updated requirements of the security policy for accessing the computing resource;

receiving an updated message from the policy server; and either continuing to forward the network received from the computing device traffic towards the computing resource or removing the records on the routing device indicating the computing device is authorized to access the computing resource.

39. The computer-implemented method of claim 37, wherein the network traffic includes a packet encapsulating a TCP SYN connection request and has a source IP address not authorized to access the computing resource in the records of the computing resource.

40. The computer-implemented method of claim 37, further comprising:

after a specified validity period expires, re-collecting the posture credential from the posture program;

forwarding the re-collected posture credential to the policy server, wherein the policy server performs a reassessment of the re-collected posture credential to determine whether the re-collected posture credential indicates the computing device continues to satisfy requirements of the security policy for accessing the computing resource;

receiving an updated message from the policy server; and either continuing to forward the network received from the computing device traffic towards the computing resource or removing the records on the routing device indicating the computing device is authorized to access the computing resource.

41. The computer-implemented method of claim 37, wherein the posture credential indicates one or more of an antivirus software version, an antivirus definition version, a firewall software version, an operating system version, a malware protection software version, an operating system patch version, and an occurrence time of the most recent antivirus scan.

42. The computer-implemented method of claim 37, further comprising authenticating a user of the computing device.

43. The computer-implemented method of claim 37, wherein the remediation server hosts one or more resources needed to update the then current configuration state of the one or more components on the computing device to satisfy the requirements of the security policy.

44. A non-transitory computer-readable medium containing a program which, when executed, performs an operation to control access to computing resources in a network, by using a routing device, a policy server, and a remediation server and based on security posture credentials and remediation attributes, the operation comprising:

receiving, by the routing device connected to the network, from a computing device connected to the network, network traffic directed to a computing resource available over the network;

in response, collecting, from a posture program, security posture credential indicating a current configuration state of one or more components on the computing device, wherein the posture program comprises at least one of: (i) a posture agent executing on the computing device; (ii) a posture plug-in executing on the computing device; and (iii) an audit server operatively connected to the computing device;

forwarding the security posture credential collected from the computing device to the policy server by operation of one or more computer processors when executing the program, wherein the policy server performs an initial evaluation of the security posture credential of the computing device in order to determine a posture validation result indicating whether the computing device satisfies requirements of a security policy for accessing the computing resource;

upon receiving a message from the policy server indicating that the security posture credential does not satisfy requirements of the security policy, redirecting access by:

forwarding one or more remediation attributes to the remediation server to update, based on the one or more remediation attributes, the then current configuration state of the one or more components on the computing device in order to satisfy the requirements of the security policy; and forwarding network traffic from the computing resource towards the remediation server without granting access to the computing resource in the network; and upon receiving a message from the policy server indicating that the security posture credential satisfies the requirements of the security policy, or upon receiving a message from the remediation server indicating that the then current configuration state was successfully updated, granting access by:

forwarding network traffic received from the computing device towards the computing resource; and updating records on the routing device in order to indicate the computing device is authorized to access the computing resource;

wherein upon receiving a message from the remediation server indicating that the then current configuration state was not successfully updated, the routing device limits or denies access to the computing resource without limiting or denying any communications traffic destined for locations outside the network.

45. A routing device to control access to computing resources in a network, by operating in conjunction with a policy server and a remediation server and based on security posture credentials and remediation attributes, the routing device comprising:

one or more computer processors;

a memory containing a program which, when executed by the one or more computer processors, performs an operation comprising:

receiving, by the routing device connected to the network, from a computing device connected to the network, network traffic directed to a computing resource available over the network;

in response, collecting, from a posture program, a security posture credential indicating a current configuration state of one or more components on the computing device, wherein the posture program comprises at least one of: (i) a posture agent executing on the computing device; (ii) a posture plug-in executing on the computing device; and (iii) an audit server operatively connected to the computing device;

forwarding the security posture credential collected from the computing device to the policy server, wherein the policy server performs an initial evaluation of the security posture credential of the computing device in order to determine a posture validation result indicating whether the computing device satisfies requirements of a security policy for accessing the computing resource;

upon receiving a message from the policy server indicating that the security posture credential does not satisfy requirements of the security policy, redirecting access by:

forwarding one or more remediation attributes to the remediation server to update, based on the one or more remediation attributes, the then current configuration state of the one or more components on the computing device in order to satisfy the requirements of the security policy; and forwarding network traffic from the computing resource towards the remediation server without granting access to the computing resource in the network; and upon receiving a message from the policy server indicating that the security posture credential satisfies the requirements of the security policy, or upon receiving a message from the remediation server indicating that the then current configuration state was successfully updated, granting access by:

forwarding network traffic received from the computing device towards the computing resource; and updating records on the routing device in order to indicate the computing device is authorized to access the computing resource;

wherein upon receiving a message from the remediation server indicating that the then current configuration state was not successfully updated, the routing device limits or denies access to the computing resource without limiting or denying any communications traffic destined for locations outside the network.

46. A computer-implemented method to control access to resources in a network by using an intercepting device, a policy server, and a remediation server and based on security posture credentials and redirect access instructions, the computer-implemented method comprising:

intercepting, by the intercepting device, one or more messages sent by a computerized device requesting access to one of the resources in the network, the intercepting device comprising a data communications device;

selecting, based on the resources for which access is requested, one or more challenge requests to provide to a posture program, whereupon the posture program evaluates a current security state of an application or component of the computing device in order to generate a security posture credential, wherein the security posture credential includes one or more affirmative descriptions of the application or component on the computerized device and represents a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving the security posture credential, forwarding the security posture credential to the policy server, whereupon the policy server analyzes the security posture credentials relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions for the remediation server to perform in order to bring the computerized device into compliance with the security policy; and applying the redirect access instruction at the intercepting device by operation of one or more computer processors, to communications traffic originating from the computerized device and destined for resources within the network, in order to grant the computerized device with access to the remediation server without including access to the resources in the network;

wherein upon determining the posture validation result indicates that the computerized device satisfies the requirements of the security policy, or upon successful completion of the one or more remedial actions to bring the computerized device into compliance with the security policy, the policy server generates a grant access instruction applicable by the intercepting device to grant the computerized device with access to the resources in the network;

wherein upon failure of the one or more remedial actions to bring the computerized device into compliance with the security policy, the policy server generates a restrict access instruction applicable by the intercepting device to limit or deny access to the resources in the network, wherein the restrict access instruction is not applicable to restrict routing of any communications traffic destined for locations outside the network.

47. A non-transitory computer-readable medium containing a program which, when executed, performs an operation to control access to resources in a network by using an intercepting device, a policy server, and a remediation server and based on security posture credentials and access instructions, the operation comprising:

intercepting, by the intercepting device, one or more messages sent by a computerized device requesting access to one of the resources in the network, the intercepting device comprising a data communications device;

prior to granting the computerized device with the requested access to the network, and in response to intercepting the one or more messages sent by the computerized device, selecting, based on the resources for which access is requested one or more challenge requests to provide to a posture program, whereupon the posture program evaluates a current security state of an application or component of the computing device in order to generate a security posture credential, wherein the security posture credential includes one or more affirmative descriptions of the application or component on the computerized device and represents a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving the security posture credential, forwarding the security posture credential to the policy server, whereupon the policy server analyzes the security posture credentials relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions for the remediation server to perform in order to bring the computerized device in compliance with the security policy; and applying the redirect access instruction at the intercepting device by operation of one or more computer processors when executing the program, to communications traffic originating from the computerized device and destined for resources within the network in order to grant the computerized device with access to the remediation server without including access to the resources in the network;

wherein upon determining the posture validation result indicates that the computerized device satisfies the requirements of the security policy, or upon successful completion of the one or more remedial actions to bring the computerized device into compliance with the security policy, the policy server generates a grant access instruction applicable by the intercepting device to grant the computerized device with access to the resources in the network;

wherein upon failure of the one or more remedial actions to bring the computerized device into compliance with the security policy, the policy server generates a restrict access instruction applicable by the intercepting device to limit or deny access to the resources in the network, wherein the restrict access instruction is not applicable to restrict routing of any communications traffic destined for locations outside the network.

48. A routing device to control access to computing resources in a network, by operating in conjunction with a policy server and a remediation server and based on security posture credentials and access instructions, the routing device comprising:

one or more computer processors;

a memory containing a program which, when executed by the one or more computer processors, performs an operation comprising:

intercepting one or more messages sent by a computerized device requesting access to one of the resources in the network;

selecting, based on the resources for which access is requested, one or more challenge requests to provide to a posture program, whereupon the posture program evaluates a current security state of an application or component of the computing device in order to generate a security posture credential, wherein the security posture credential includes one or more affirmative descriptions of the application or component on the computerized device and represents a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving the security posture credential, forwarding the security posture credential to the policy server, whereupon the policy server analyzes the security posture credential relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions to be performed for the remediation server to perform in order to bring the computerized device into compliance with the security policy; and applying the redirect access instruction to communications traffic originating from the computerized device and destined for resources within the network, in order to grant the computerized device with access to the remediation server without including access to the resources in the network;

wherein upon determining the posture validation result indicates that the computerized device satisfies the requirements of the security policy, or upon successful completion of the one or more remedial actions to bring the computerized device into compliance with the security policy, the policy server generates a grant access instruction applicable by the routing device to grant the computerized device with access to the resources in the network;

wherein upon failure of the one or more remedial actions to bring the computerized device into compliance with the security policy, the policy server generates a restrict access instruction applicable by the routing device to limit or deny access to the resources in the network, wherein the restrict access instruction is not applicable to restrict routing of any communications traffic destined for locations outside the network.

49. A computer-implemented method to control access to resources in a network by using an intercepting device, a policy server, and a remediation server and based on security posture credentials and access instructions, the computer-implemented method comprising:

intercepting, by the intercepting device, one or more messages sent by a computerized device requesting access to one of the resources in the network, the intercepting device comprising a data communications device;

selecting, based on the resources for which access is requested, one or more challenge requests to provide to a posture program, whereupon the posture program evaluates a current security state of an application or component of the computing device in order to generate a corresponding security posture credential representing a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving the security posture credential, forwarding the security posture credential to the policy server, whereupon the policy server analyzes the security posture credential relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions for the remediation server to perform in order to bring the computerized device into compliance with the security policy; and applying the redirect access instruction at the intercepting device by operation of one or more computer processors, to communications traffic originating from the computerized device and destined for resources within the network, in order to grant the computerized device with access to the remediation server without including access to the resources in the network;

wherein upon determining the posture validation result indicates that the computerized device satisfies the requirements of the security policy, or upon successful completion of the one or more remedial actions to bring the computerized device into compliance with the security policy, the policy server generates a grant access instruction applicable by the intercepting device to grant the computerized device with access to the resources in the network;

wherein upon failure of the one or more remedial actions to bring the computerized device into compliance with the security policy, the policy server generates a restrict access instruction applicable by the intercepting device to limit or deny access to the resources in the network, wherein the restrict access instruction is not applicable to restrict routing of any communications traffic destined for locations outside the network;

wherein responsive to an update to the accepted credential set after the computerized device is granted with access to the resources in the network, the intercepting device transmits a posture update query to the computerized device and forwards a posture update response from the posture program to the policy server.

50. A non-transitory computer-readable medium containing a program which, when executed, performs an operation to control access to resources in a network by using an intercepting device, a policy server, and a remediation server and based on security posture credentials and access instructions, the operation comprising:

intercepting, by the intercepting device, one or more messages sent by a computerized device requesting access to one of the resources in the network, the intercepting device comprising a data communications device;

selecting, based on the resources for which access is requested, one or more challenge requests to provide to a posture program, whereupon the posture program evaluates a current security state of an application or component of the computing device in order to generate a security posture credential representing a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving the security posture credential, forwarding the security posture credential to the policy server, whereupon the policy server analyzes the security posture credential relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions for the remediation server to perform in order to bring the computerized device into compliance with the security policy; and applying the redirect access instruction at the intercepting device by operation of one or more computer processors when executing the program, to communications traffic originating from the computerized device and destined for resources within the network, in order to grant the computerized device with access to the remediation server without including access to the resources in the network;

wherein upon determining the posture validation result indicates that the computerized device satisfies the requirements of the security policy, or upon successful completion of the one or more remedial actions to bring the computerized device into compliance with the security policy, the policy server generates a grant access instruction applicable by the intercepting device to grant the computerized device with access to the resources in the network;

wherein upon failure of the one or more remedial actions to bring the computerized device into compliance with the security policy, the policy server generates a restrict access instruction applicable by the intercepting device to limit or deny access to the resources in the network, wherein the restrict access instruction is not applicable to restrict routing of any communications traffic destined for locations outside the network;

wherein responsive to an update to the accepted credential set after the computerized device is granted with access to the resources in the network, the intercepting device transmits a posture update query to the computerized device and forwards a posture update response from the posture program to the policy server.

51. A routing device to control access to computing resources in a network, by operating in conjunction with a policy server and a remediation server and based on security posture credentials and access instructions, the routing device comprising:

one or more computer processors;

a memory containing a program which, when executed by the one or more computer processors, performs an operation comprising:

intercepting one or more messages sent by a computerized device requesting access to one of the resources in the network;

selecting, based on the resources for which access is requested, one or more challenge requests to provide to a posture program, whereupon the posture program evaluates a current security state of an application or component of the computing device in order to generate a security posture credential representing a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving the security posture credential, forwarding the security posture credential to the policy server, whereupon the policy server analyzes the security posture credential relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions for the remediation server to perform in order to bring the computerized device into compliance with the security policy; and applying the redirect access instruction to communications traffic originating from the computerized device and destined for resources within the network in order to grant the computerized device with access to the remediation server without including access to the resources in the network;

wherein upon determining that the posture validation result indicates that the computerized device satisfies the requirements of the security policy, or upon successful completion of the one or more remedial actions to bring the computerized device into compliance with the security policy, the policy server generates a grant access instruction applicable by the routing device to grant the computerized device with access to the resources in the network;

wherein upon failure of the one or more remedial actions to bring the computerized device into compliance with the security policy, the policy server generates a restrict access instruction applicable by the routing device to limit or deny access to the resources in the network, wherein the restrict access instruction is not applicable to restrict routing of any communications traffic destined for locations outside the network;

wherein responsive to an update to the accepted credential set after the computerized device is granted with access to the resources in the network, the routing device transmits a posture update query to the computerized device and forwards a posture update response from the posture program to the policy server.

52. A computer-implemented method to control access to resources in a network by using an intercepting device, a policy server, and a remediation server and based on security posture credentials, and access instructions, the computer-implemented method comprising:

intercepting, by the intercepting device, one or more messages sent by a computerized device requesting access to one of the resources in the network, the intercepting device comprising a data communications device;

selecting, based on the resources for which access is requested, one or more challenge requests to provide to a posture program, whereupon the posture program evaluates a current security state of an application or component of the computing device in order to generate a security posture credential representing a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving the security posture credential, forwarding the security posture credential to the policy server, whereupon the policy server analyzes the security posture credentials relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions for the remediation server to perform in order to bring the computerized device into compliance with the security policy; and applying the redirect access instruction at the intercepting device by operation of one or more computer processors, to communications traffic originating from the computerized device and destined for resources within the network, in order to grant the computerized device with access to the remediation server without including access to the resources in the network;

wherein upon determining the posture validation result indicates that the computerized device satisfies the requirements of the security policy, or upon completion of the one or more remedial actions to bring the computerized device into compliance with the security policy, the policy server generates a grant access instruction applicable by the intercepting device to grant the computerized device with access to the resources in the network;

wherein responsive to an update to the accepted credential set after the computerized device is granted with access to the resources in the network, the intercepting device transmits a posture update query to the computerized device and forwards a posture update response from the posture program to the policy server, whereupon the policy server analyzes the posture update response relative to the updated credential set in order to determine an updated posture validation result for the computerized device and generates a restrict access instruction based on the updated posture validation result, wherein the restrict access instruction is applicable by the intercepting device to limit or deny access to the resources in the network, wherein the restrict access instruction is not applicable to restrict routing of any communications traffic destined for locations outside the network.

53. A routing device to control access to computing resources in a network, by operating in conjunction with a policy server and a remediation server and based on security posture credentials and access instructions, the routing device comprising:

one or more computer processors;

a memory containing a program which, when executed by the one or more computer processors, performs an operation comprising:

intercepting one or more messages sent by a computerized device requesting access to one of the resources in the network;

selecting, based on the resources for which access is requested, one or more challenge requests to provide to a posture program, whereupon the posture program evaluates a current security state of an application or component of the computing device in order to generate a security posture credential representing a current security state of the computerized device, wherein the posture program comprises at least one of: (i) a posture agent executing on the computerized device; (ii) a posture plug-in executing on the computerized device; and (iii) an audit server operatively connected to the computerized device;

subsequent to receiving the security posture credential, forwarding the security posture credential to the policy server, whereupon the policy server analyzes the security posture credential relative to an accepted credential set representing requirements of a security policy for accessing the resources, in order to determine a posture validation result indicating whether the computerized device satisfies the requirements of the security policy;

wherein upon determining the posture validation result indicates that the computerized device does not satisfy the requirements of the security policy, the policy server generates a redirect access instruction specifying one or more remedial actions for the remediation server to perform in order to bring the computerized device into compliance with the security policy; and applying the redirect access instruction to communications traffic originating from the computerized device and destined for resources within the network, in order to grant the computerized device with access to the remediation server without including access to the resources in the network;

wherein upon determining the posture validation result indicates that the computerized device satisfies the requirements of the security policy, or upon completion of the one or more remedial actions to bring the computerized device into compliance with the security policy, the policy server generates a grant access instruction applicable by the routing device to grant the computerized device with access to the resources in the network;

wherein responsive to an update to the accepted credential set after the computerized device is granted with access to the resources in the network, the routing device transmits a posture update query to the computerized device and forwards a posture update response from the posture program to the policy server, whereupon the policy server analyzes the posture update response relative to the updated credential set in order to determine an updated posture validation result for the computerized device and generates a restrict access instruction based on the updated posture validation result, wherein the restrict access instruction is applicable by the routing device to limit or deny access to the resources in the network, wherein the restrict access instruction is not applicable to restrict routing of any communications traffic destined for locations outside the network.

* * * * *

UNITED STATES PATENT AND TRADEMARK OFFICE
CERTIFICATE OF CORRECTION

PATENT NO.        : 9,436,820 B1
APPLICATION NO.   : 10/909755
DATED             : September 6, 2016
INVENTOR(S)       : Robert E. Gleichauf et al.

Page 1 of 1

It is certified that error appears in the above-identified patent and that said Letters Patent is hereby corrected as shown below:

In the Drawings
On sheet 2 of 7, in Figure 2, reference numeral 104, Line 2, delete "REQUES," and insert -- REQUEST, --, therefor.
In the Specification
In Column 2, Line 8, after "itself" insert -- . --.
In Column 2, Line 64, delete "then" and insert -- than --, therefor.
In Column 5, Line 45, after "may be" delete "to".
In Column 15, Line 59, delete "out-of date" and insert -- out-of-date --, therefor.
In the Claims
In Column 31, Line 62, in Claim 19, delete "the then-current" and insert -- the then current --, therefor.

Signed and Sealed this
Third Day of January, 2017

Michelle K. Lee
*Director of the United States Patent and Trademark Office*